United States Patent
Flores et al.

(10) Patent No.: US 7,251,613 B2
(45) Date of Patent: Jul. 31, 2007

(54) SYSTEM AND METHOD FOR GENERATING A MULTI-LAYERED STRATEGY DESCRIPTION INCLUDING INTEGRATED IMPLEMENTATION REQUIREMENTS

(75) Inventors: David R. Flores, Laguna Beach, CA (US); Michael Charles Mente, Buena Park, CA (US); James McClymont Stauffer, Corona del Mar, CA (US)

(73) Assignee: David Flores ( * ) Notice: Subject to any disclaimer, the term of this patent is extended or adjusted under 35 U.S.C. 154(b) by 985 days.

(21) Appl. No.: 10/002,977

(22) Filed: Nov. 14, 2001

(65) Prior Publication Data

US 2003/0046126 A1    Mar. 6, 2003

Related U.S. Application Data

(63) Continuation-in-part of application No. 09/947,455, filed on Sep. 5, 2001, now abandoned.

(51) Int. Cl.
G06Q 10/00    (2006.01)
(52) U.S. Cl. ....................................... 705/10
(58) Field of Classification Search ............... 705/10, 705/7

See application file for complete search history.

(56) References Cited

U.S. PATENT DOCUMENTS

| | | | | |
|---|---|---|---|---|
| 5,875,431 | A * | 2/1999 | Heckman et al. | 705/7 |
| 5,999,908 | A * | 12/1999 | Abelow | 705/1 |
| 6,405,159 | B2 * | 6/2002 | Bushey et al. | 703/13 |
| 6,411,936 | B1 * | 6/2002 | Sanders | 705/10 |
| 6,556,974 | B1 * | 4/2003 | D'Alessandro | 705/10 |

(Continued)

FOREIGN PATENT DOCUMENTS

GB    2363223 A  *  12/2001

OTHER PUBLICATIONS

McGrath, Michael E; "Setting the PACE in Product Development", Chapter 7—The Process of Product Strategy, 1996, Elsevier, pp. 101-119.*

(Continued)

Primary Examiner—Romain Jeanty
Assistant Examiner—Jonathan G Sterrett

(57) ABSTRACT

An enterprise strategy management system includes a first software module adapted to formulate a strategy description based on an assessment of environmental data, a second software module adapted to align the strategy description with available enterprise resources and deploy strategy implementation responsibilities, and a third software module adapted to measure the execution of the strategy and identify opportunities to optimize strategic performance. The first, second and third software modules are adapted to implement a continuous strategy management cycle, and may be executed in any order. In one embodiment, the first software module is an STRATEGY FORMULATION module, the second software module is an STRATEGY ALIGNMENT module and the third module is an STRATEGY IMPLEMENTATION module. The STRATEGY FORMULATION module includes software components for assessing environmental data, formulating and analyzing strategic alternatives and determining and approving a final, multi-level strategy description. The STRATEGY ALIGNMENT module includes software components for aligning strategy components, describing and aligning operational strategy components, planning projects, initiatives and performance metrics activity, and deploying implementation responsibilities. The STRATEGY IMPLEMENTATION module includes software components for activating the launch of activities, implementing and measuring the execution of strategy and performance results, and identifying the opportunities to optimize strategic performance.

1 Claim, 21 Drawing Sheets

U.S. PATENT DOCUMENTS

| | | | |
|---|---|---|---|
| 2003/0187716 A1* | 10/2003 | Lee | 705/10 |
| 2004/0059627 A1* | 3/2004 | Baseman et al. | 705/10 |
| 2004/0068429 A1* | 4/2004 | MacDonald | 705/10 |
| 2004/0093232 A1* | 5/2004 | Murray | 705/1 |
| 2004/0107125 A1* | 6/2004 | Guheen et al. | 705/7 |

OTHER PUBLICATIONS

Elsawy, Omar A; Malhotra, Arvind; Gosain, Sanjay; "IT-intensive value innovation in the electronic economy: Insights from Marshall Industries", Sep. 1999, MIS Quarterly, 23, 3, 305, Dialog 11787125 58530838.*

Mahoney, Joseph T; Pandian, J. Rajenddran: "The Resource-Based View Within the Conversation of Strategic Management", Jun. 1992, Strategic Management Journal, v13n5, pp. 363-380, Dialog 00727030 93-76251.*

* cited by examiner

Strategic Planning Process

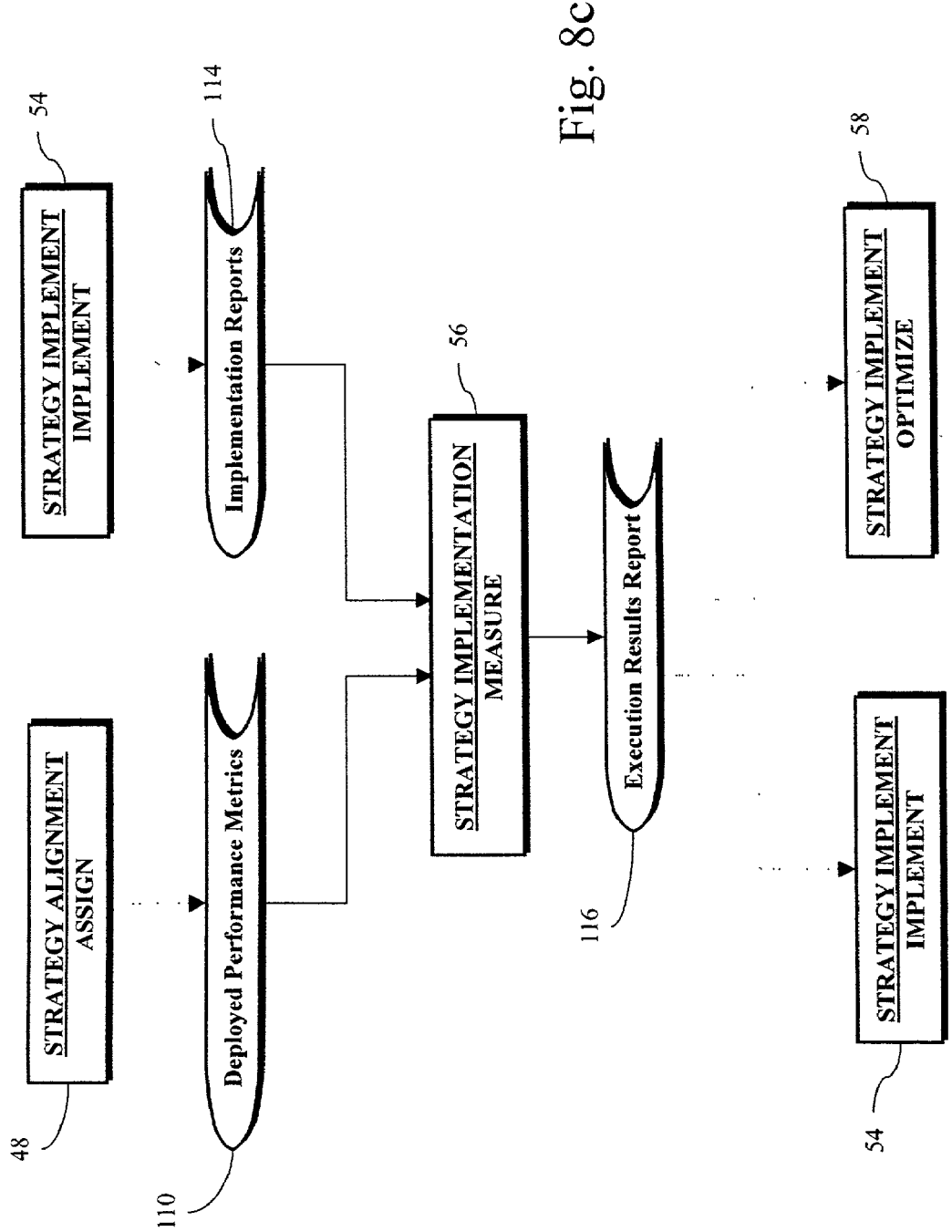

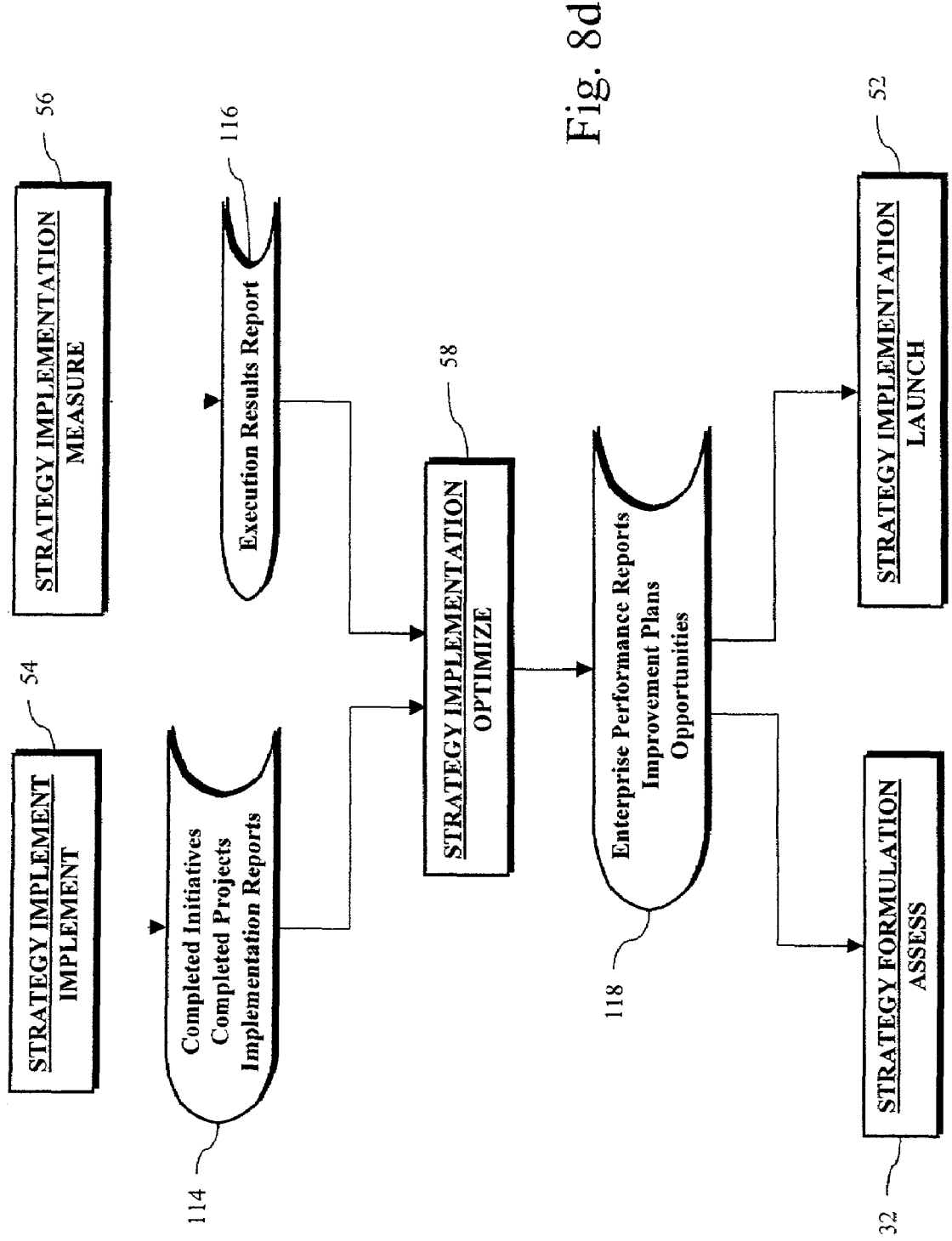

SYSTEM AND METHOD FOR GENERATING A MULTI-LAYERED STRATEGY DESCRIPTION INCLUDING INTEGRATED IMPLEMENTATION REQUIREMENTS

RELATED APPLICATION DATA

This is a continuation-in-part of application Ser. No. 09/947,455, filed Sep. 5, 2001 now abandoned, entitled "System and Method for Enterprise Strategy Management."

BACKGROUND OF THE INVENTION

1. Field of the Invention

The present invention relates generally to the field of strategic planning and, in particular, to a system and method for generating a multi-layered strategy description and integrated implementation requirements.

2. Description of the Related Art

Strategy management is critical to the success of many organizations such as businesses, charities, government agencies and schools. Through a strategic planning process, the leaders of an organization attempt to clarify the organization's long-term goals and develop a plan for accomplishing those goals. A successful strategy anticipates future threats to the organization and positions the organization to take advantage of new opportunities that may arise.

The strategic planning process is time consuming, expensive and requires a complex analysis of the organization and its environment. As a result, the typical strategic planning process is implemented only once per year and only addresses a small subset of the issues that face the organization. A conventional strategic planning process for a business is illustrated in the diagram of FIG. 1. A strategic planning committee is created from the business' senior management, and the members of the strategic planning committee conduct an audit of the business and its environment (i.e., an environmental scan) to determine the business' strengths and weaknesses (Step 2). A typical audit involves intensive data gathering from sources throughout the business organization, as well as sources external to the business. Next, the planning committee defines the organization's mission, vision and guiding principles (Step 4). A mission statement describes the present nature of the business, including the business' purpose and direction (i.e., the goals the business is trying to accomplish). A vision statement describes the desired future of the business, and guiding principles outline the values and philosophy of the business that guide the behavior of its personnel.

The planning committee compares the current state of the business, as determined by the environmental scan and the mission statement, to the business' desired future as identified in the vision statement and guiding principles. Based on this comparison, the planning committee identifies long-term goals, which define the changes the business should implement in order to achieve its stated vision (Step 6). The planning committee selects a manageable number of long-terms goals (e.g., 10) that are reasonable for the business to achieve and defines strategies for achieving these selected goals. The environmental scan, mission, vision, guiding principles and long-term goals and strategies are compiled into a formal strategic plan, which is used by managers throughout the organization to create operating plans directed towards accomplishing the organization's goals (Step 8). Managers and employees then implement the operating plans (Step 10). After creating the formal strategic plan, the planning committee disbands until the following year when a new strategic planning process will start.

A common obstacle to an organization's successful implementation of a strategic plan is the inability of the organization's managers to create operating plans that efficiently advance the organization's strategic direction. The planning committee's role involves articulating the organization's vision, objectives and strategies in the strategic planning document. However, this high-level document seldom includes the details necessary to guide managers through implementation decisions such as the prioritization of resources, the determination of implementation requirements and setting time frames. The success of strategy implementation is further compromised when the strategic direction is insufficiently described in the strategic planning document, the managers misinterpret the strategic planning document, the managers lack the resources that are necessary to implement the strategic plan or the assumptions underlying the strategic plan change.

SUMMARY OF THE INVENTION

The present invention is a system and method for generating a multi-layered strategy description and integrated implementation requirements. In a preferred embodiment, a user device communicates with a web server over one or more communications networks such as the Internet, intranets, local area networks, wireless networks and telephone networks. The web server is connected to an application server that executes applications for managing and implementing an enterprise strategy management application (ESM). The application server is connected to a data storage that stores a plurality of databases used by the ESM. In a preferred embodiment, the application server is also connected to an integration engine, which provides integration services between the ESM and other enterprise applications, such as an enterprise resource planning application, a supply chain management application or a client relationship management application. Through the integration engine, the ESM may share data and reports with other enterprise applications.

In a preferred embodiment, the ESM includes a STRATEGY FORMULATION software module, a STRATEGY ALIGNMENT software module and a STRATEGY IMPLEMENTATION software module. The STRATEGY FORMULATION module includes applications and processes for assisting the organization's management in setting and refining the strategic direction of the organization. In operation, end users utilize the STRATEGY FORMULATION module to assess the organization's internal and external environment, formulate and analyze strategic alternatives and determine and approve a final strategy description. The STRATEGY ALIGNMENT module includes applications and processes for assisting the organization's management in focusing the enterprise on achieving the described strategic goals. In operation, end users utilize the STRATEGY ALIGNMENT module to align described strategy components, describe and align operational strategy components, plan projects, initiatives and performance metrics activity, and deploy implementation responsibilities. The STRATEGY IMPLEMENTATION module includes applications and processes for assisting the organization's management in efficiently distributing and executing the organization's strategy. In operation, end users utilize the STRATEGY IMPLEMENTATION module to the launch of activities, implement and measure the execution of strategy and performance results, and identify opportunities to optimize strategic performance. In a preferred embodiment, the STRATEGY FORMULATION module, STRATEGY ALIGNMENT module and STRATEGY IMPLEMENTATION module interact to create a continuous strategy planning cycle. Unlike the prior art strategic planning processes, the steps in the continuous strategy planning cycle may be executed at any time and in any order, allowing management to take advantage of new opportunities as they arise and refine the strategic plan as problems are presented.

The STRATEGY FORMULATION module preferably includes four software components (ASSESS, FORMULATE, ANALYZE and SELECT) that function as a continuous STRATEGY FORMULATION cycle. The four software components may be executed at any time and in any order. The ASSESS component assists the organization's management in identifying the key forces in both the internal and external environments that may affect the organization in the future and analyzing how these forces affect the current and future of the organization. The FORMULATE component assists the organization's management in creating and articulating alternative strategies for the organization. The ANALYZE component assists the organization's management in reviewing strategic alternatives through the use of analytic methods. The SELECT component assists the organization's management in selecting and finalizing the vision and strategy of the organization.

In a preferred embodiment, the FORMULATE component includes a strategy formulation engine that assists the user with the generation of a multi-layered strategy description that includes integrated implementation requirements. The strategy formulation engine includes at least three layers. In the first layer the organization's strategic direction is described, including the current state of the organization and a vision of the organization's future. In the third layer, strategy platform requirements are identified for implementing the strategy. In the second layer, the strategy description and the strategy platform requirements are integrated.

In a preferred embodiment, the strategy formulation engine provides a framework for creating a five-layer strategy description. In the first layer, the user formulates a description of the strategic direction of the organization's growth strategy, including a vision of the organization's future and a target date for achieving the vision. In the second layer, the user breaks down the strategic direction into a more detailed description of the evolution of the organization's business phases, with each business phase having an associated target date. In the third layer, the user creates a roadmap of strategy platforms for the organization to follow over the course of the strategic timeframe. The user is preferably provided with a graphical user interface for selecting, creating, manipulating and interconnecting strategy platforms. In the fourth layer, the strategy platforms are selected, created and/or modified to achieve the strategic vision. In a preferred embodiment, each strategy platform includes requirements and outputs. Strategy platform requirements define the specific needs that are necessary to create the strategy platform. Strategy platform outputs identify the direct and indirect benefits expected to be received from the implementation of the strategy platform. The inputs to a strategy platform include at least one list of strategy platform requirements. Strategy platform requirements are the detailed requirements for the strategy platforms and may be directly processed and transformed into implementation activities. In the fifth layer, the strategy platform requirements are identified and categorized and current capabilities and future requirements for the strategy platform requirements to assist with the strategic goals are defined.

The STRATEGY ALIGNMENT module preferably includes four components (ALIGN STRATEGY, ALIGN OPERATIONS, PLAN and ASSIGN) that function as a continuous cycle. The four software components may be executed by an end user at any time and in any order. The ALIGN STRATEGY component assists the organization's management in ensuring that the strategic elements of the approved strategy are aligned. In a preferred embodiment, alignment is performed using an alignment matrix that illustrates the relationship between two strategic elements. The ALIGN OPERATIONS component assists the organization's management in ensuring that essential aspects of the organization's operations, technology, and people are aligned with the approved strategy. The PLAN component assists the organization's management in developing plans corresponding to the alignment. The ASSIGN component assists the organization's management in the synchronization, approval and assignment of enterprise initiatives, projects and metrics.

The STRATEGY IMPLEMENTATION module preferably includes four components (LAUNCH, IMPLEMENT, MEASURE and OPTIMIZE) that function as a continuous cycle. The four software components may be executed by an end user at any time and in any order. The LAUNCH component manages the launch of implementation activity for the strategy across the enterprise. The IMPLEMENT component facilitates the day-to-day management of initiatives, projects and metrics. The MEASURE component tracks and reports on the implementation of the organization's strategy. The OPTIMIZE component identifies opportunities and areas for improvement that arise during the execution of the organization's strategy.

A more complete understanding of the System and Method for Generating a Multi-layered Strategy Description Including Integrated Implementation Requirements will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

FIGS. 8a–d illustrate a preferred data flow of the software components of a STRATEGY IMPLEMENTATION module.

DESCRIPTION OF A PREFERRED EMBODIMENT

In a preferred embodiment of the present invention, an enterprise strategy management application includes a framework for generating a multi-layered strategy description and integrated implementation requirements. In the detailed description of a preferred embodiment that follows, like element numerals are used to describe like elements illustrated in one or more the aforementioned figures.

Figure 2:
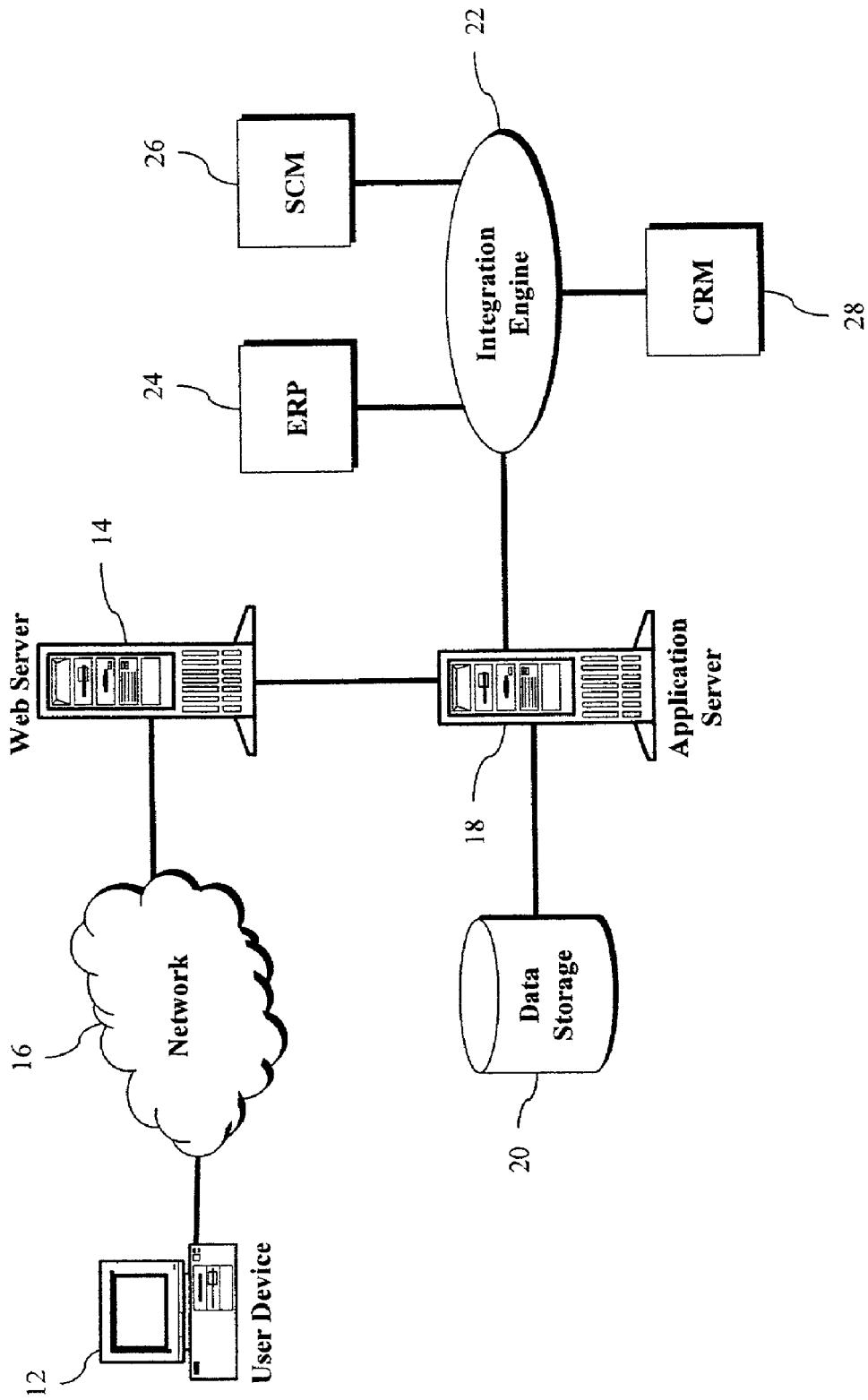
FIG. 2 illustrates a preferred environment for an enterprise strategy management system.

A preferred operating environment for an enterprise strategy management application (ESM) is illustrated in FIG. 2. At least one user device 12 is adapted to communicate with at least one web server 14 through a network 16. The network 16 may include one or more communications networks that facilitate communications between the user device 12 and the web server 14, such as the Internet, intranets, local area networks, wireless networks and telephone networks. In a preferred embodiment, the user device 12 is a personal computer. However, the user device 12 may be any device that is adapted to communicate with the web server 14, such as a personal digital assistant, wireless application protocol telephone or television set-top box. The web server 14 preferably includes one or more World Wide Web servers that are adapted to serve content to the user device 12 through web browser software executing on the user device 12.

The web server 14 is connected to an application server 18, preferably through a local area network. In a preferred embodiment, the application server 18 is a JAVA application server that executes applications for managing and implementing the enterprise strategy management application. The application server 18 is connected to a storage system 20 that stores a plurality of databases used by the ESM. The storage system 20 may include a database server, a storage area network, one or more network attached storage devices or any other data storage device or system that is capable of storing ESM data. The application server 18 is preferably connected to an integration engine 22, which provides integration services between the ESM and other enterprise applications, such as an enterprise resource planning application 24, a supply chain management application 26 or a client relationship management application 28. The integration engine 22 may execute on the application server 18 and/or one or more other servers connected to the application server 18. Through the integration engine 22, the ESM shares data and reports with other enterprise applications.

It should be appreciated that the operating environment described in FIG. 2 is merely illustrative and that alternative network and server configurations are contemplated within the scope and spirit of the present invention. For example, in alternative embodiments the functions performed by the data storage 20, application server 18 and web server 14 may be performed by a single computer system or by a plurality of computer systems distributed across any number of locations.

Figure 3:
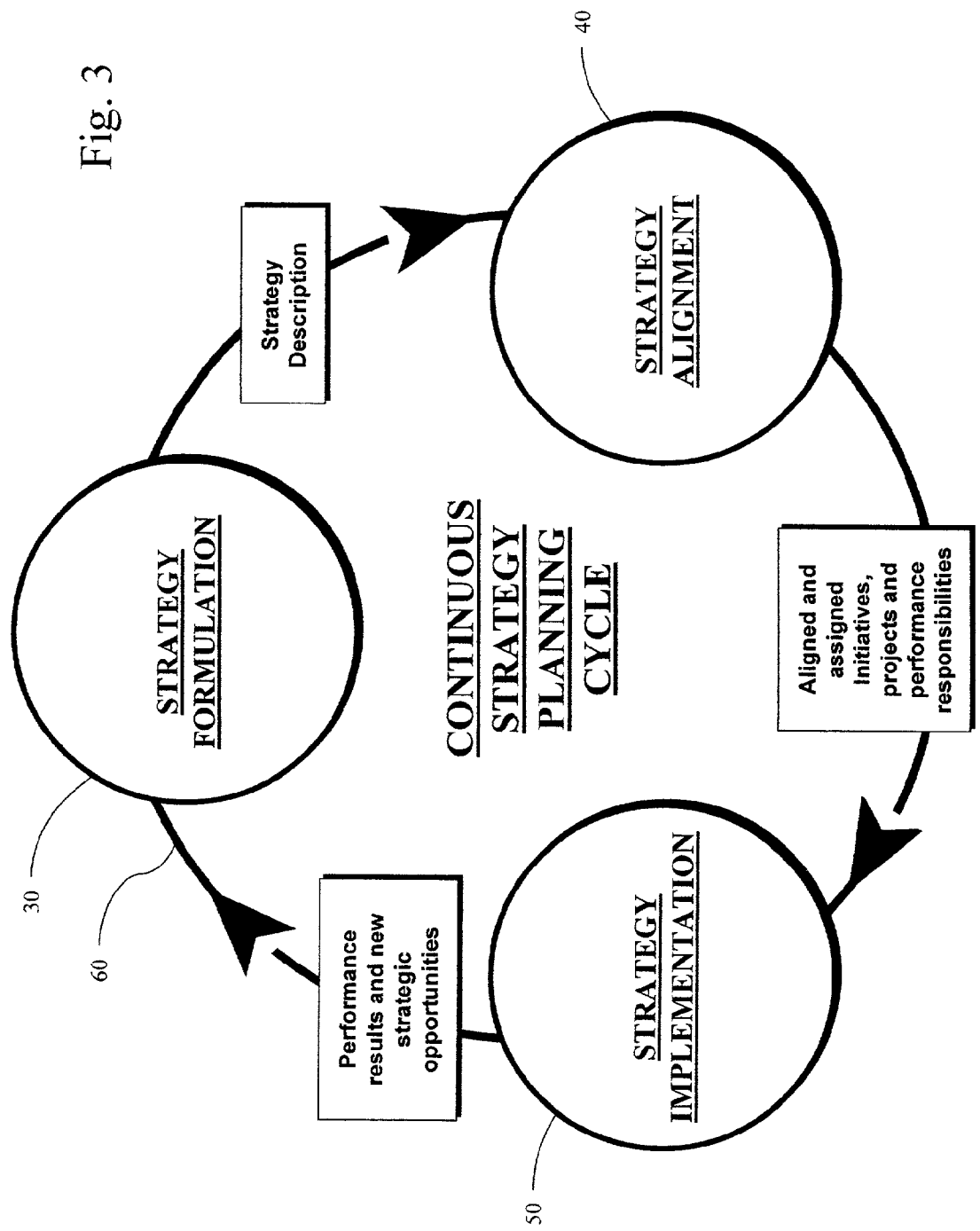
FIG. 3 illustrates a preferred embodiment of an enterprise strategy management application.

The ESM will now be described with reference to FIG. 3. In a preferred embodiment, the ESM is a software application that includes a STRATEGY FORMULATION software module 30, a STRATEGY ALIGNMENT software module 40 and a STRATEGY IMPLEMENTATION software module 50. The STRATEGY FORMULATION module 30 includes applications and processes for assisting the organization's management in setting and refining the strategic direction of the organization. In operation, end users utilize the STRATEGY FORMULATION module 30 to assess the internal and external environment including performance results and newly identified strategic opportunities, formulate and analyze strategic alternatives and determine and approve a final strategy description. The STRATEGY ALIGNMENT module 40 includes applications and processes for assisting the organization's management in focusing the entire enterprise on achieving the described strategic goals. In operation, end users utilize the STRATEGY ALIGNMENT module 40 to align the described strategy components, describe and align operational strategy components, plan projects, initiatives and performance metrics activity, and deploy implementation responsibilities. The STRATEGY IMPLEMENTATION module 50 includes applications and processes for assisting the organization's management in efficiently distributing and executing the organization's strategy. In operation, end users utilize the STRATEGY IMPLEMENTATION module 50 to activate the launch of activities, implement and measure the execution of strategy and performance results, and identify the opportunities to optimize strategic performance.

As will be described in greater detail below, the STRATEGY FORMULATION module 30, the STRATEGY ALIGNMENT module 40 and the STRATEGY IMPLEMENTATION module 50 interact to drive a continuous strategy planning cycle 60 that offers many advantages over the prior art. Unlike the prior art, the STRATEGY FORMULATION module 30 provides a computer-implemented process for formulating strategy and the STRATEGY ALIGNMENT module 40 provides a computer-implemented process for aligning strategy with organizational resources. In addition, the continuous strategy planning cycle 60 provides a framework that allows for the efficient management and implementation of a larger number of strategic objectives than is practical under a traditional strategy planning approach. Unlike the prior art, the steps in the continuous strategy planning cycle 60 may be executed at any time and in any order, allowing the organization to take advantage of opportunities as they arise and refine different aspects of the strategic plan as problems are presented. In addition, the continuous strategy planning cycle 60 provides a framework to allow refinements to be made across multiple strategy planning cycles. This allows an organization to select more ambitious strategic objectives (including strategic objectives that may not appear achievable) than would be practical to implement under the prior art approaches. Additional advantages of the present invention should be readily apparent to persons having ordinary skill in the art.

Figure 4:
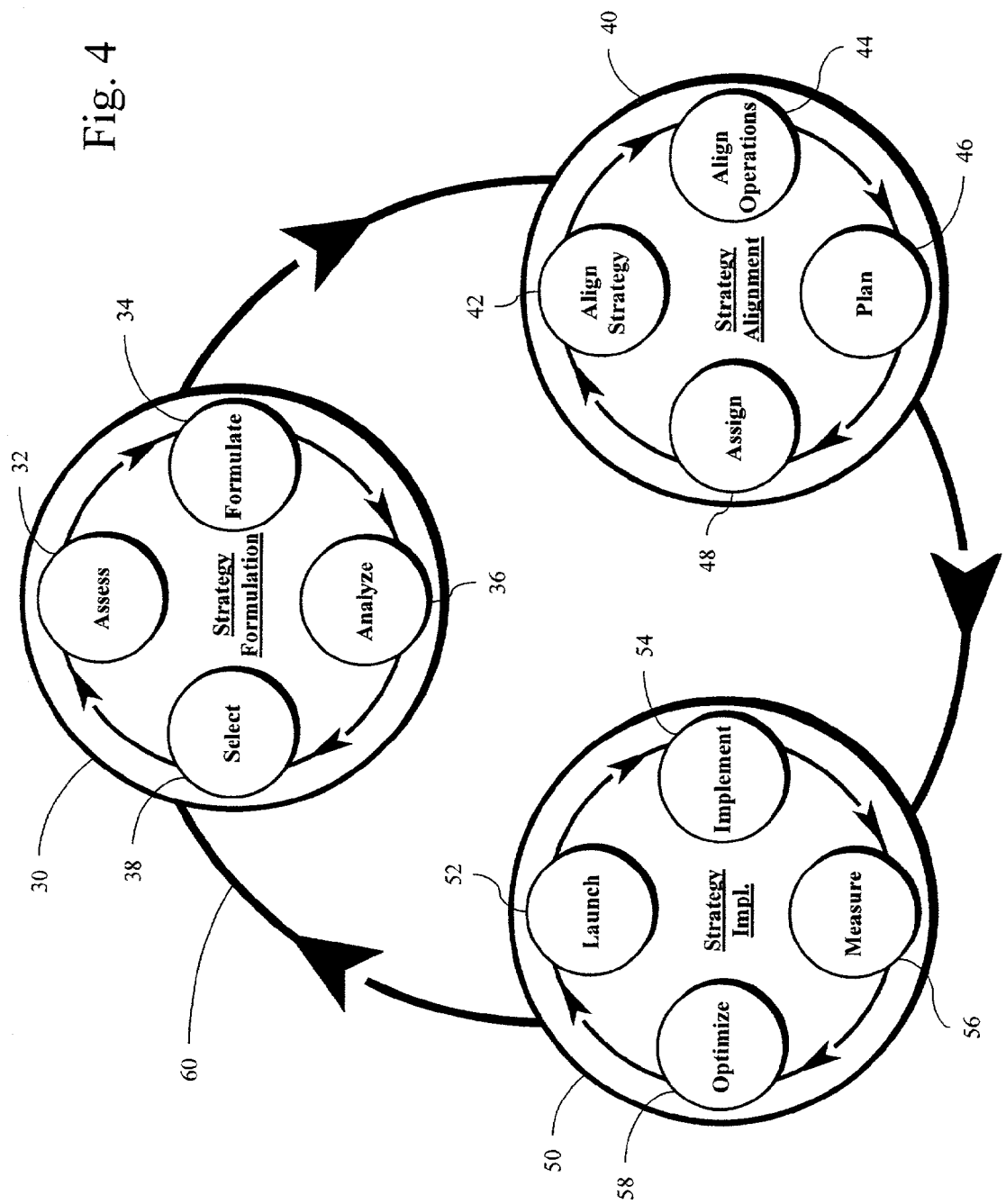
FIG. 4 illustrates a preferred embodiment of the software modules of an enterprise strategy management application.
Figure 5A:
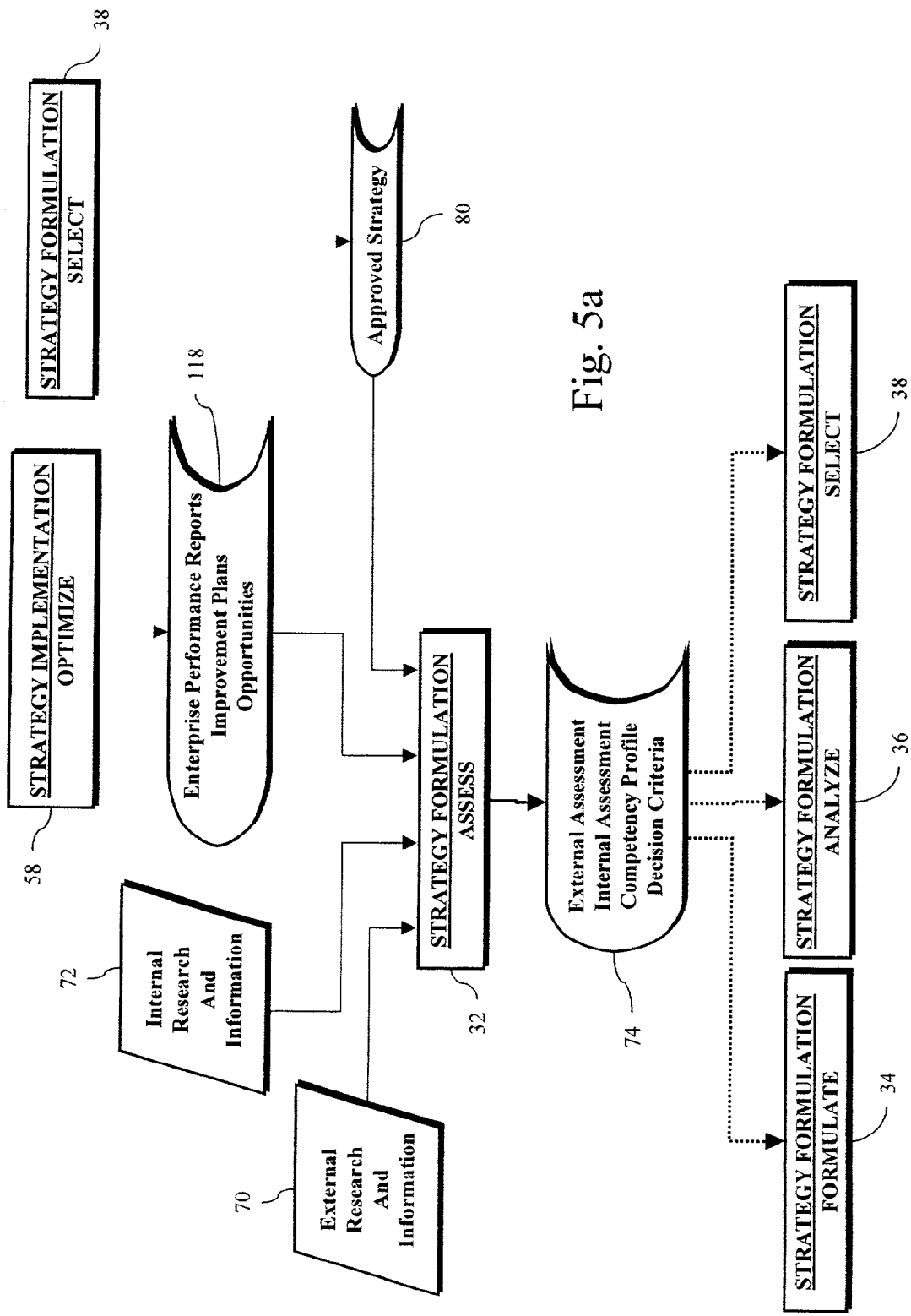
FIGS. 5a–d illustrate a preferred data flow of the software components of a STRATEGY FORMULATION module.

As illustrated in FIG. 4, the STRATEGY FORMULATION module 30 preferably includes four software components: ASSESS 32, FORMULATE 34, ANALYZE 36 and SELECT 38. The software components of the STRATEGY FORMULATION module 30 interact to function as a continuous strategy formulation cycle and may be executed by end users at any time and in any order. A preferred embodiment of the ASSESS component 32 is illustrated in FIG. 5a. The ASSESS component 32 includes processes for assisting the organization's management in identifying and analyzing the key forces in both the internal and external environments that may affect the organization in the future. The ASSESS component 32 analyzes environmental data from external research/information 70 (e.g., market data obtained from third-party research firms), internal research/information 72 (e.g., data received from other enterprise applications through the integration engine), the current approved strategy 80 (produced by the SELECT component 38) and enterprise performance information 104 (produced by the STRATEGY IMPLEMENTATION module 50 from a prior strategy planning cycle) using techniques of environmental scanning and competitive intelligence. In the preferred embodiment, the data used by the modules and components of the ESM may be accessed through the storage system 20 (see FIG. 2). Based on the analysis of the input data, the ASSESS module 32 generates output data 74, including an external environmental assessment, an internal environmental assessment, a competency profile of the organization and decision criteria. The output data 74 may be produced using conventional analytical approaches such as Strength, Weakness, Opportunity & Threat Analysis (SWOT Analysis) and internal Value Chain Analysis.

Figures 5B, 5C:
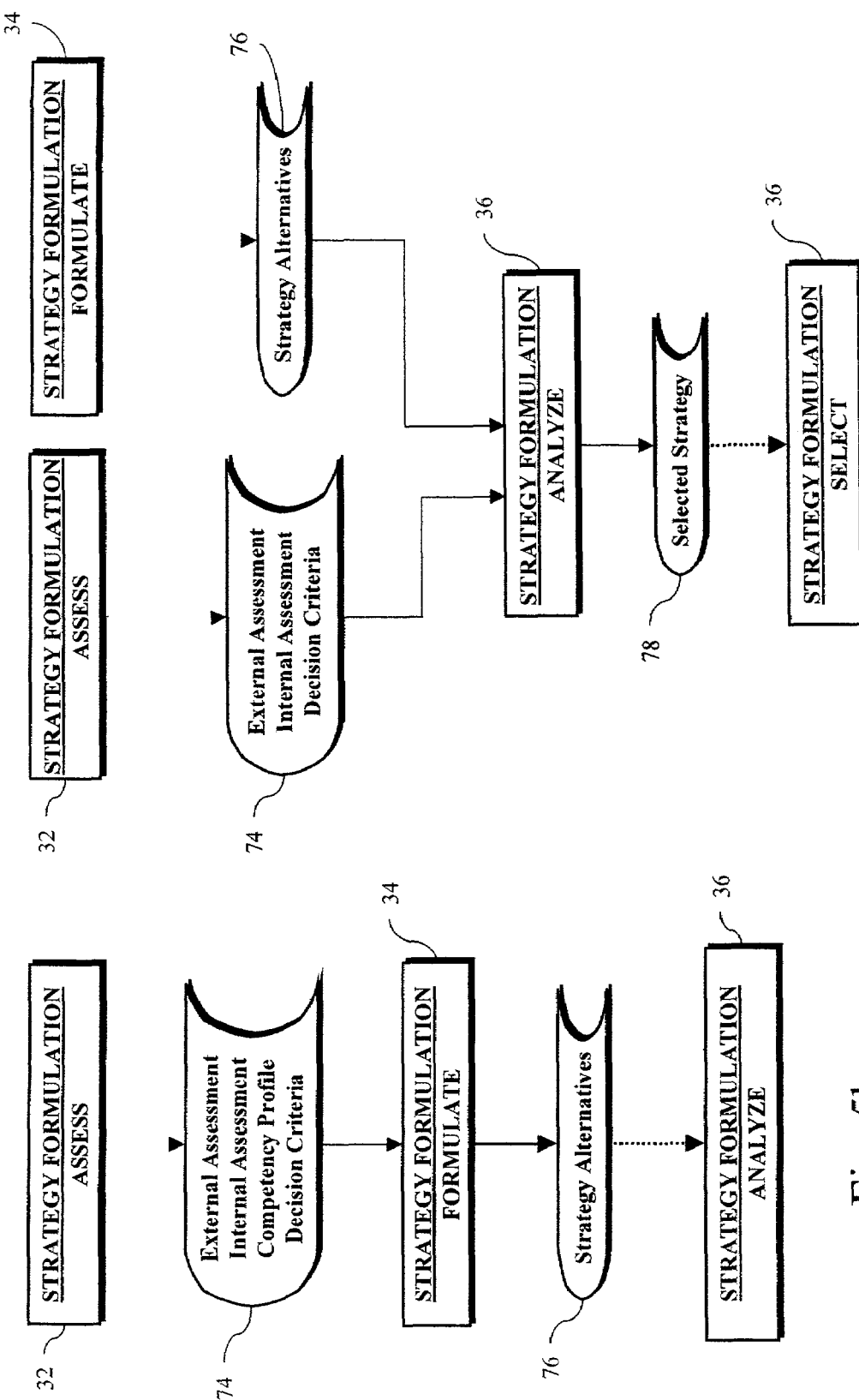

A preferred embodiment of the FORMULATE component 34 is illustrated in FIG. 5*b*. The FORMULATE component 34 includes processes for assisting the organization's management in creating and articulating alternative strategies for the organization. The FORMULATE component 34 retrieves the external assessment, internal assessment, competency profile and decision criteria 74 generated by the ASSESS module 32 and analyzes the data to formulate strategy alternatives 76. The strategy alternatives 76 may be produced using conventional approaches and concepts such as Five-Forces Competitive Analysis and Strategic Groups, or through a strategy formulation engine that assists the user with the generation of a multi-layered strategy description that includes integrated implementation requirements.

Figures 9, 13:
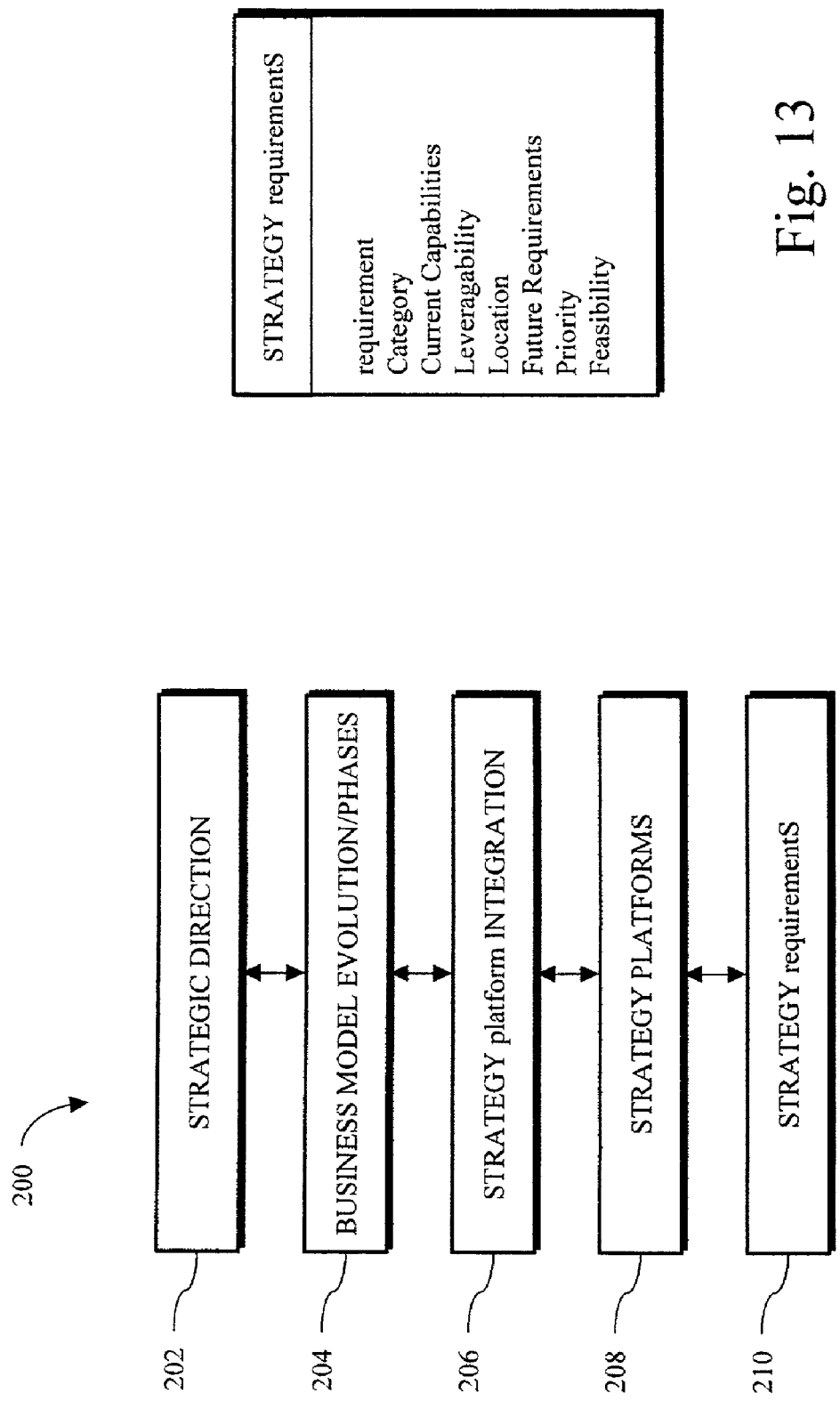
FIG. 9 illustrates a preferred strategy formulation engine.
FIG. 13 is a preferred database structure for storing strategy requirements data.

A preferred embodiment of a strategy formulation engine will now be described with reference to FIGS. 9–13. As illustrated in FIG. 9, the strategy formulation engine assists the organization in generating a multi-layered strategy description 200 that integrates the organization's strategic direction 202 with strategy platform requirements 210. At the highest level, strategic direction 202, the organization's strategic direction is described, including the current state of the organization and a vision of the organization's future. At the lowest level, strategy platform requirements 210, detailed requirements are identified for implementing the strategy. The strategic direction layer 202 and the strategy platform requirements layer 210 are integrated through at least one intermediate layer, such as business model evolution/phases layer 204, strategy platform integration layer 206 and strategy platforms layer 208.

Figure 10A:
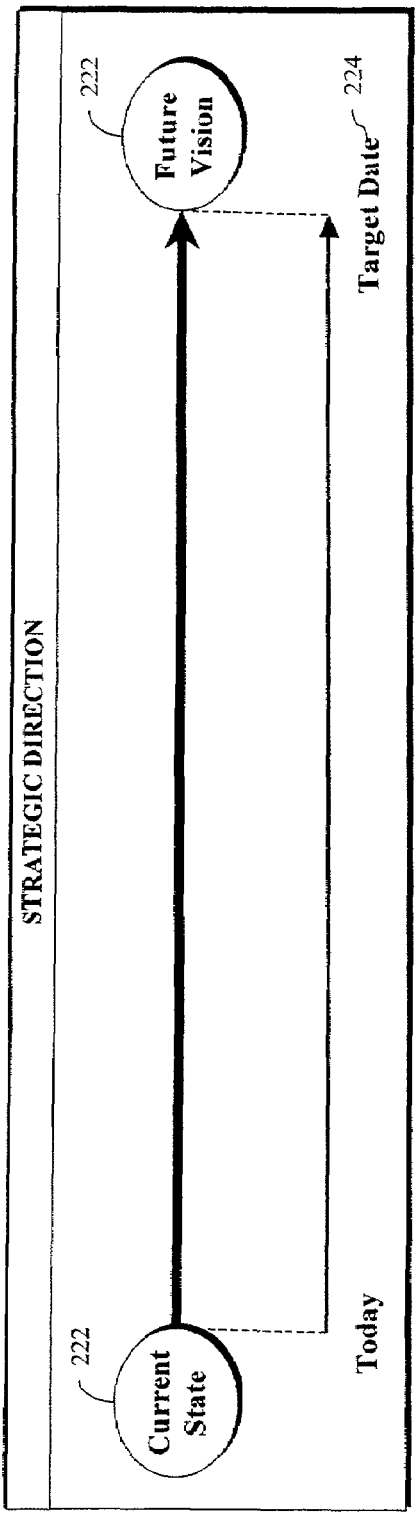
FIGS. 10a–c illustrate user views of various levels of a strategy formulation engine.

A preferred operation of the strategy formulation engine will now be described with reference to FIGS. 10*a*–*c* & 11. As illustrated, the strategy formulation engine provides the user with at least one interface for each layer 202–210 that allows the user to create, edit and manipulate information associated with the layer. An interface for viewing the first layer, strategic direction 202, is illustrated in FIG. 10*a*. In this layer, the user formulates a description of the strategic direction of the organization's growth strategy, including a vision of the organization's future 220 and a target date 222 for achieving the vision 220. In a preferred embodiment, the strategic direction corresponds to a conventional vision statement, but may include a more complex description or be presented in an alternative format that is suited to the organization. For example, the strategic direction may be comprised of a single phrase, such as "creating world class technical support systems," or a detailed report which may be adapted from the data output from the ASSESS component. In a preferred embodiment, the strategy formulation engine stores sample descriptions of current states 224 and future visions 220 for selection and/or editing by the user. These samples may include descriptions from a prior continuous strategy planning cycle, user defined samples and predefined samples that include common descriptions of current states 224 and future visions 220.

Figure 10B:
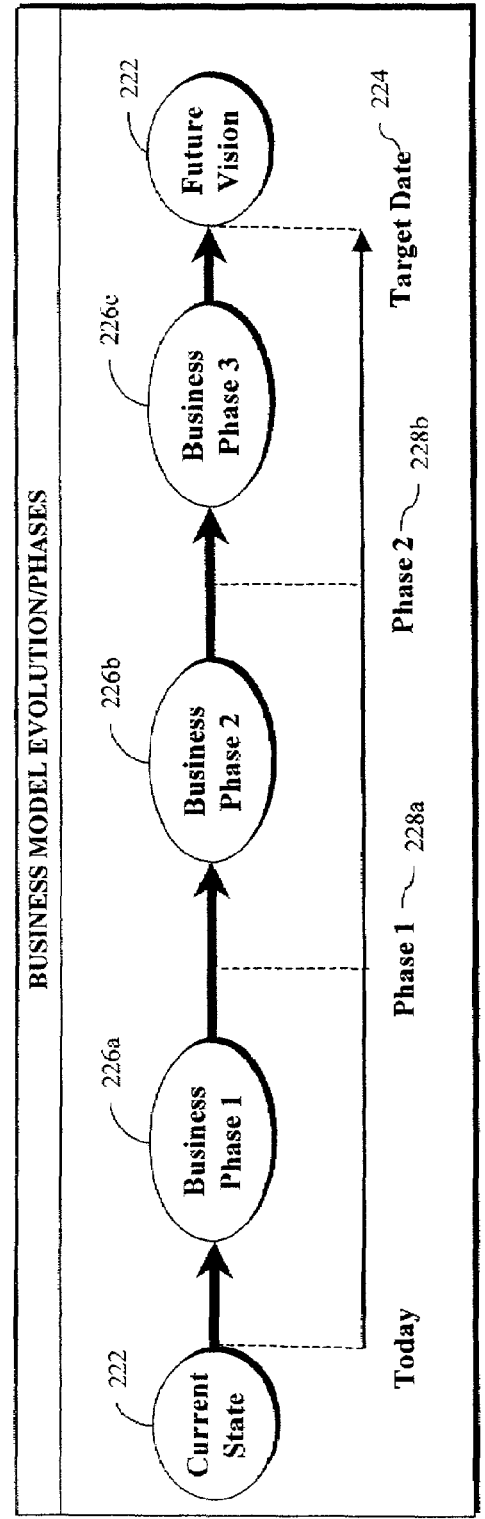

A preferred interface for viewing the second layer, business model evolution/phases 202, is illustrated in FIG. 10*b*. In the second layer, the user breaks down the strategic direction 202 into a more detailed description of the evolution of the organization's business phases. Each business phase, such as business phases 226*a*–*c* has an associated target date 228*a*–*b* and 224 for completion of the business phase. For example, a computer hardware company with a disjointed technical support operation may have a strategic vision of "creating world class technology support systems." This strategic direction may be broken down into an "enabling infrastructure phase" that includes the creation of a basic infrastructure and foundation upon which the world class technology support systems will be built. A second business phase may be an "enhanced infrastructure phase" that includes building upon the basic infrastructure to offer certain enhanced services to customers. A third business phase may be a "break through value creation phase" that includes building a breakthrough infrastructure that offers breakthrough services. In a preferred embodiment, the strategy formulation engine stores sample business phase descriptions for selection and/or editing by the user. These samples may include business phases from a prior continuous strategy planning cycle, user defined samples and predefined samples that include common business phases for implementing various strategic directions.

Figure 10C:
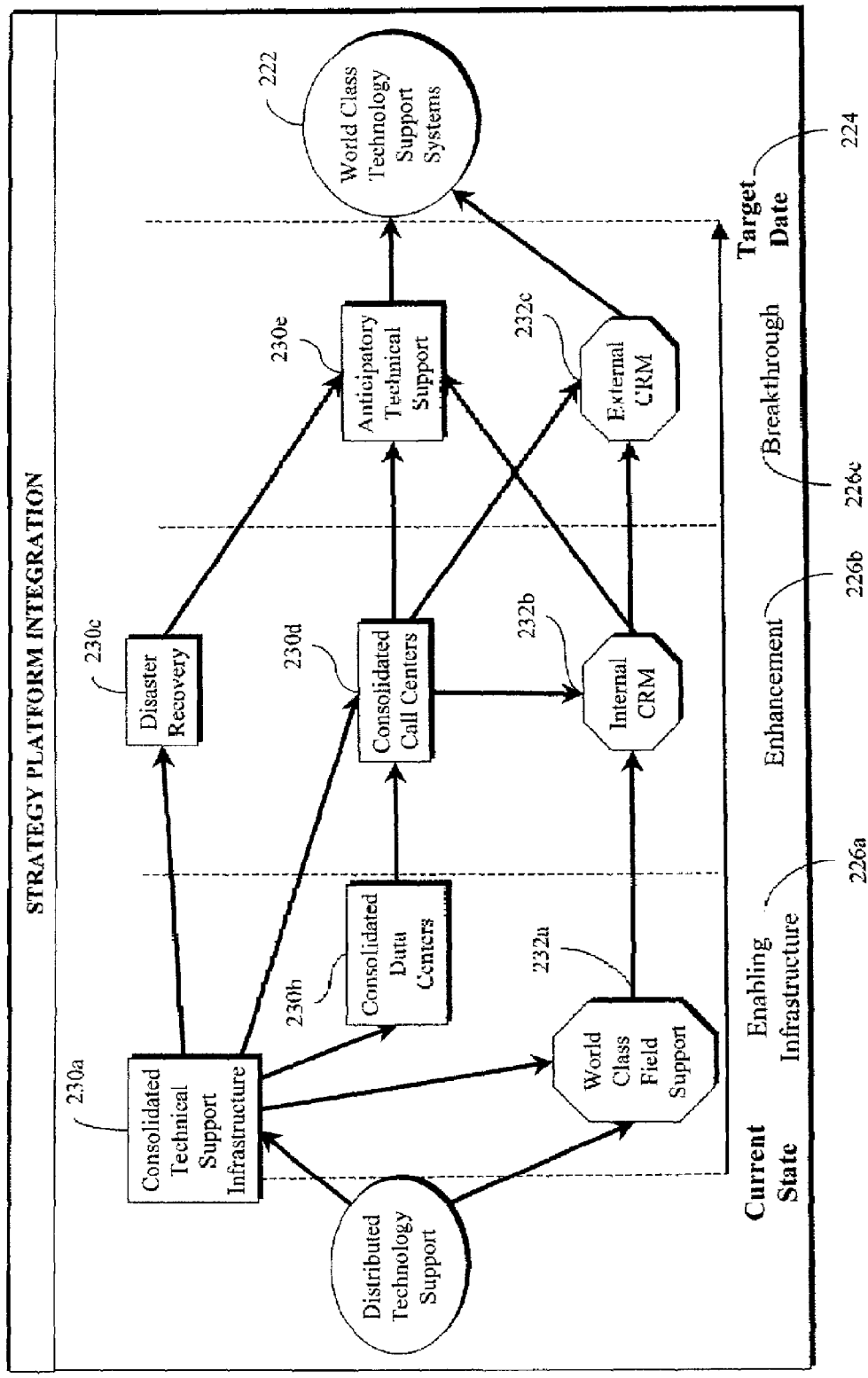

A preferred interface for viewing the third layer, strategy platform integration 206, is illustrated in FIG. 10*c*. In the third layer, the user creates a roadmap of strategy platforms for the organization to follow over the course of the strategic timeframe. As illustrated, the user is presented with a graphical user interface for selecting, creating, manipulating and interconnecting strategic platforms, such as strategic platforms 230*a*–*e* and 232*a*–*c*. The position of each strategic platform 230*a*–*e* and 232*a*–*c* correlates the strategic platform with a business phase 226*a*–*c* and arrows are used to identify the interrelationships between the strategic platforms. Preferably each strategic platform defines a milestone for achieving the corresponding business phases defined in the second layer. The strategic platforms may be selected from a list of strategic platforms, including predefined strategic platforms that are commonly used to achieve particular business phases, and strategic platforms created and/or modified in a prior strategy planning cycle.

FIG. 10*c* illustrates a strategy roadmap for a computer hardware company. In the company's current state, technology support capabilities are distributed throughout the organization. In the first layer, the strategy planning committee identified a long-term goal 220 of improving its technology support capabilities and offering world class technology support by the target date 222. In the second layer, the company identified three business phases 226*a*–*c* and target dates for the completion of each phase. In the first business phase 226*a*, the company will create the necessary infrastructure needed to enable the strategic vision 222. In the second business phase 226*b*, the company will use the infrastructure to enhance its services and capabilities. In the third business phase 226*c*, the company will build a breakthrough infrastructure to enable breakthrough services. In the third layer, the company created a roadmap of strategy platforms 230*a*–*e* and 232*a*–*c* to follow over the course of the strategic timeframe to achieve each of the business phases. In one embodiment, the strategy platforms may be grouped by the user for easier manipulation, such as the group of strategy platforms 230a–e for building out the infrastructure and the group of strategy platforms 232a–c for building out customer support capabilities. The groups may be predefined, created by the user or retrieved from prior strategy planning cycles.

Figure 11:
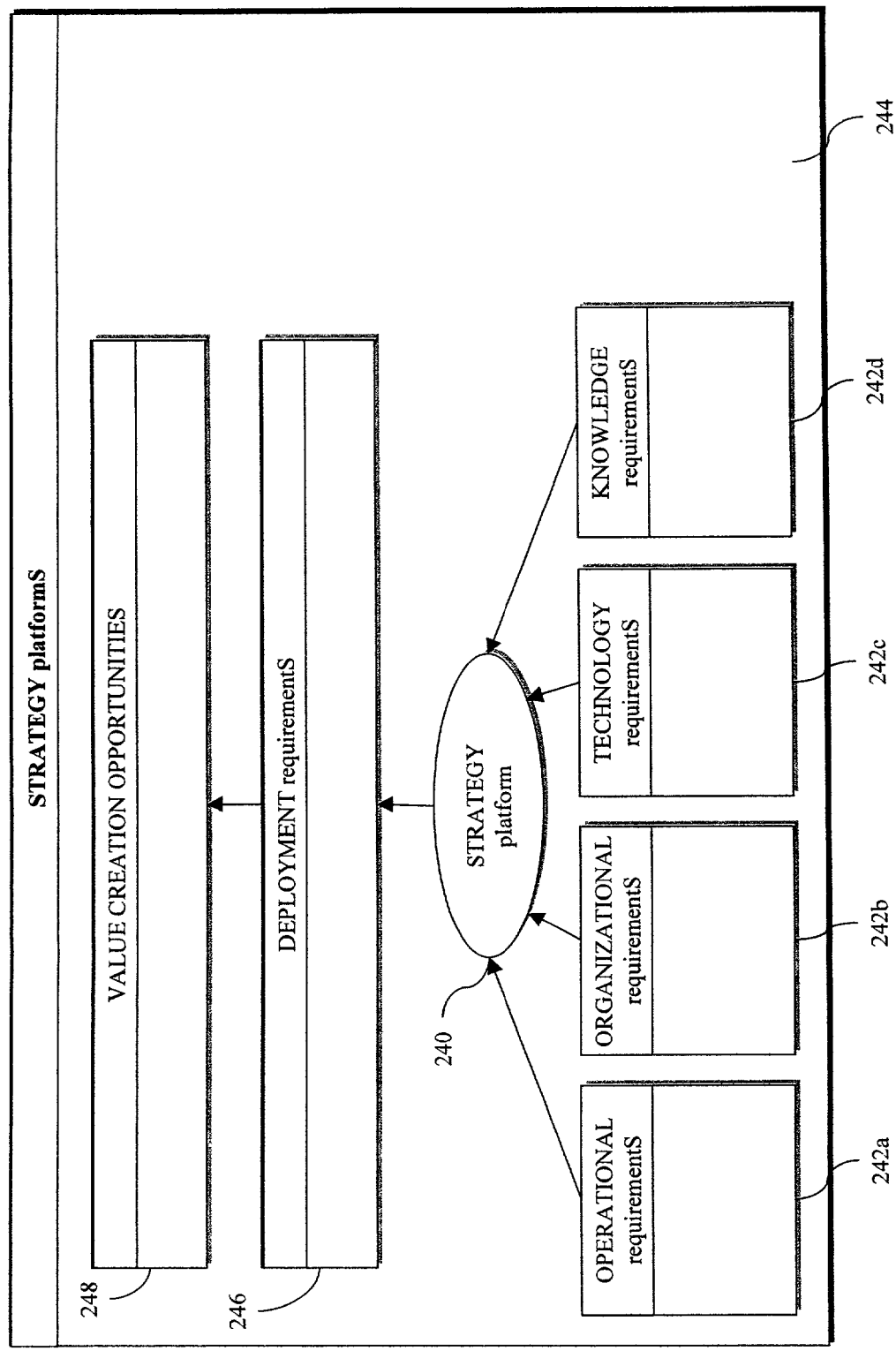
FIG. 11 illustrates a strategy platform input screen.
Figure 12:
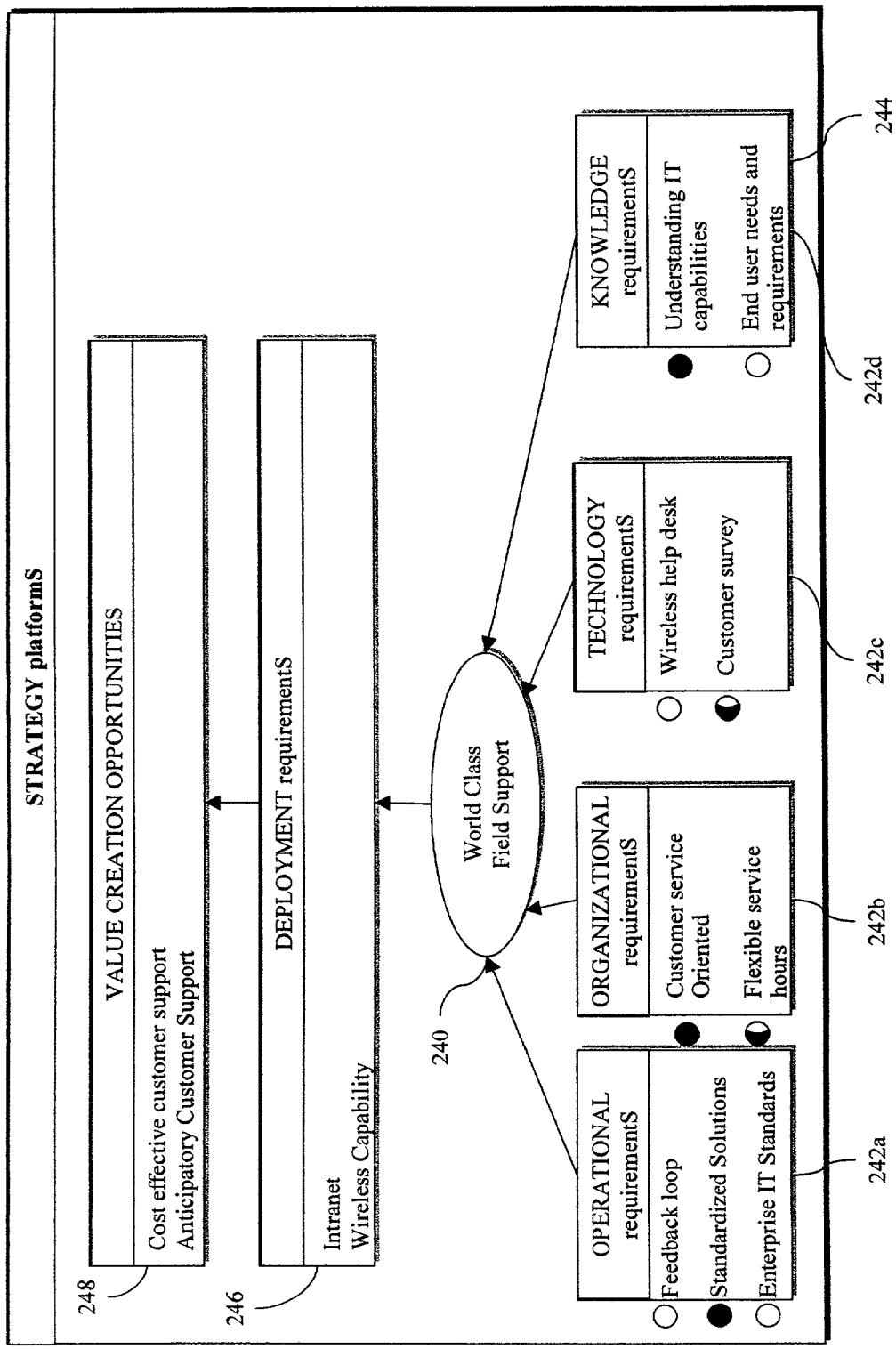
FIG. 12 provides an example of a completed strategy platform input screen.

In the fourth layer, strategy platforms 206, individual strategy platforms are selected, created and/or modified to achieve the strategic themes. In a preferred embodiment, a strategy platform is a repeatable formula for the creation of value for the organization that includes requirements and outputs. Strategy platform requirements define the inputs that are necessary to create the strategy platform. Strategy platform outputs identify the direct and indirect benefits expected to be received from the implementation of the strategy platform. A preferred interface for building the strategy platforms is illustrated in FIG. 11. The user may select a strategy platform 230 from a list of predefined strategy platforms, create a new strategy platform or edit a strategy platform used in the strategy platforms integration layer 204. In one embodiment, the user may double-click on a strategy platform in the strategy platforms integration layer 204 to view the interface for the selected strategy platform 240, such as "world class field support." The inputs to strategy platform 240 include at least one list of strategy platform requirements. Strategy platform requirements are the detailed requirements for the strategy platforms and may be directly transformed into implementation activities. In the illustrated embodiment, four groups of strategy platform requirements are used: operational requirements 242a, organizational requirements 242b, technology requirements 242c and knowledge requirements 242d. A list of the organization's competencies and capabilities may also be provided for the user. The list may be derived and updated from the competency profile generated by the ASSESS component 32 and may be edited by the user as needed. In a preferred embodiment, the user may add strategy platform requirements by dragging-and-dropping the organization's competencies and capabilities from a list (not shown) into one of the groups of strategy platform requirements 242a–d. The output of the strategy platform 240 produces deployment strategy platform requirements 246 and value creation opportunities 248. The user may select deployment strategy platform requirements 246 and value creation opportunities 248 from a predefined list, modify existing list elements and create new deployment strategy platform requirements and value creation opportunities definitions. An example of a "world class field support" strategy platform is illustrated in FIG. 12.

The fifth layer, strategy platform requirements 208, is used to define the business and operational needs necessary to build the strategy platforms. Each strategy platform requirement identified in the fourth layer, strategy platforms 206, is categorized and current capabilities and future requirements for the strategy platform requirement to assist with the strategic goals are defined. In a preferred embodiment, each strategy platform requirement also includes a corresponding degree of existence that indicates the relative availability of the strategy platform requirement. Degrees of existence may include "completely available," illustrated as full circle 250, "partially available," illustrated as a partially filled circle 252, and "not available," illustrated as an empty circle 254. A sample database structure for storing the strategy platform requirements is illustrated in FIG. 13. The stored information preferably includes sufficient detail to directly transform strategy platforms, and groups of strategy platforms, into implementation activities such as initiatives and projects. In a preferred embodiment, each initiative and project will be designed to achieve a "completely available" status for one or more strategy platform requirement.

In the preferred embodiment, the multi-layered strategy description illustrated in FIG. 9 may be created in any order and may even be created by various individuals working independently. In addition, the user may select one or more predefined business model templates to create a generic multi-layered strategy description that may be modified by the user and/or automatically updated in accordance with the organization's specific requirements. The business model templates are preferably real-world examples of successful multi-layered strategy descriptions and integrated implementation requirements that simplify the creation of the multi-layered strategy description. Strategy alternatives can be created by modifying the mappings and/or definitions in any of the layers. It should be appreciated that, as additional data is generated in the continuous strategy cycle, the strategy platforms and strategy alternatives can be automatically updated in real time. Management will obtain real time feedback on the availability of new capabilities and the expiration of old capabilities. Obsolete or faulty strategy can be immediately corrected and implemented.

A preferred embodiment of the ANALYZE component 36 is illustrated in FIG. 5c. The ANALYZE component 36 includes processes for assisting the organization's management in analyzing the strategic alternatives prepared by the FORMULATE component 34. The ANALYZE component 36 also retrieves the external assessment, internal assessment and decision criteria 74 generated by the ASSESS component 32. In a preferred embodiment, the analysis of the strategy alternatives includes a risk analysis and an assignment of a score for each strategic alternative based on the decision criteria. This may be accomplished using conventional approaches as known in the art. After analyzing the strategic alternatives, the end user may select one of the strategy alternatives 78 for implementation.

Figure 5D:
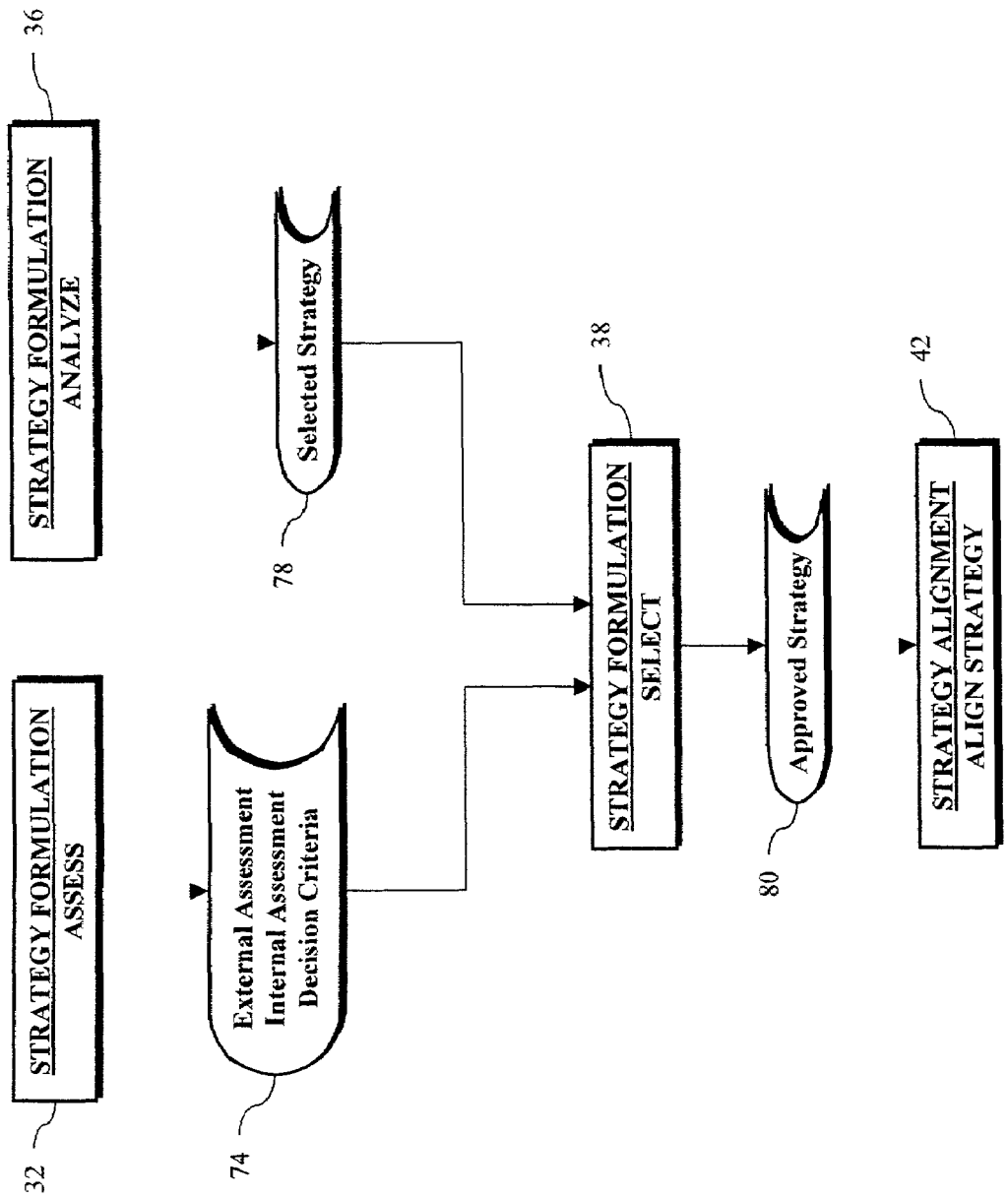

A preferred embodiment of the SELECT component 38 is illustrated in FIG. 5d. The SELECT component 38 includes processes for assisting the organization's management in selecting and finalizing the vision and strategy of the organization. The SELECT component 38 retrieves the external assessment, internal assessment and decision criteria 74 generated by the ASSESS component 32 and the selected strategy 78 generated by the ANALYSIS component 36. Through the SELECT component 38, the end user creates a detailed strategy specification and approves the finalized strategy 80. In a preferred embodiment, the finalized strategy 80 may be generated through one or more end user applications that assist the end user in defining and describing the organization's strategy in relation to the product and service it offers and the market segments the organization is targeting.

Figure 6A:
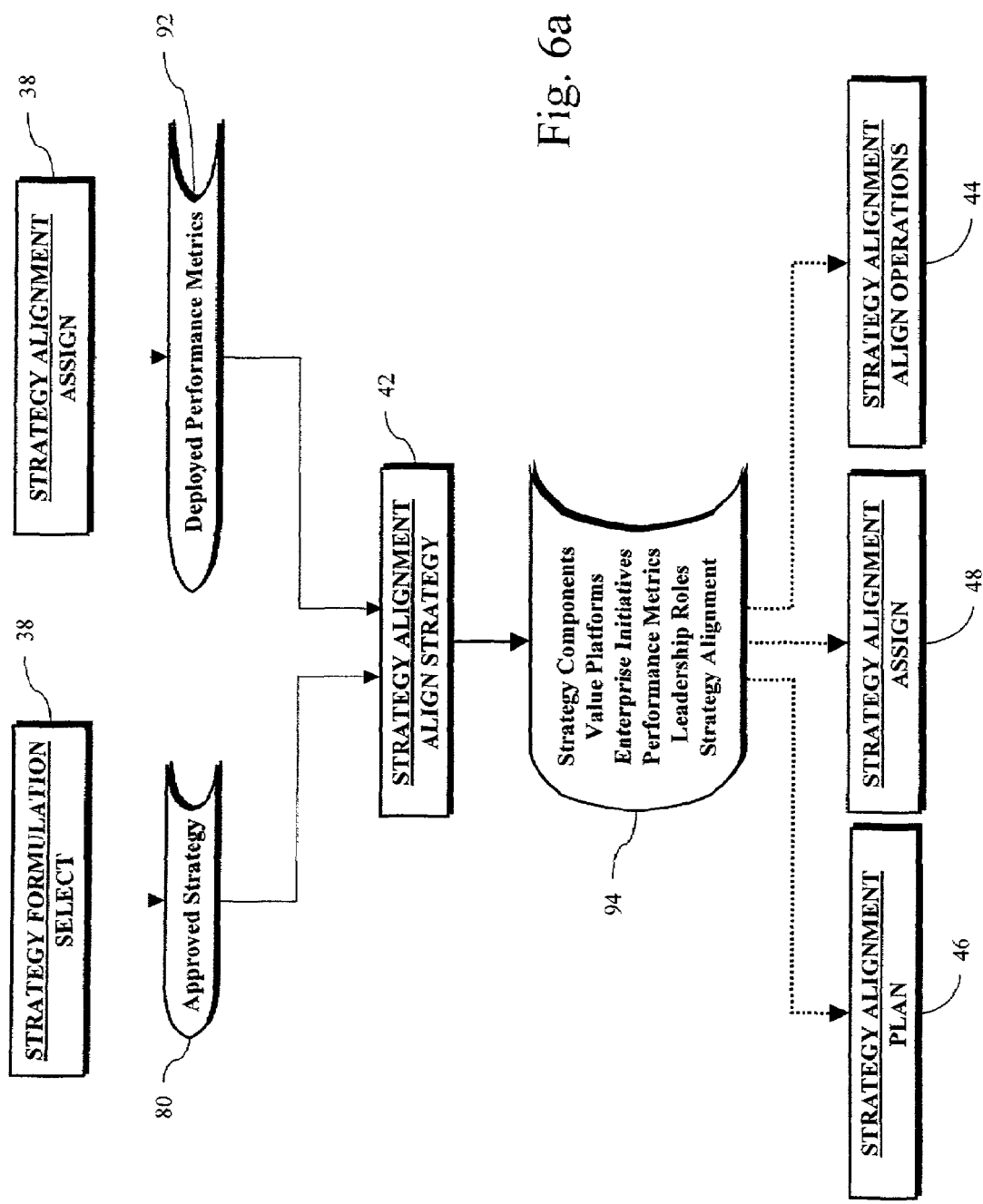
FIGS. 6a–d illustrate a preferred data flow of the software components of a STRATEGY ALIGNMENT module.
Figure 7:
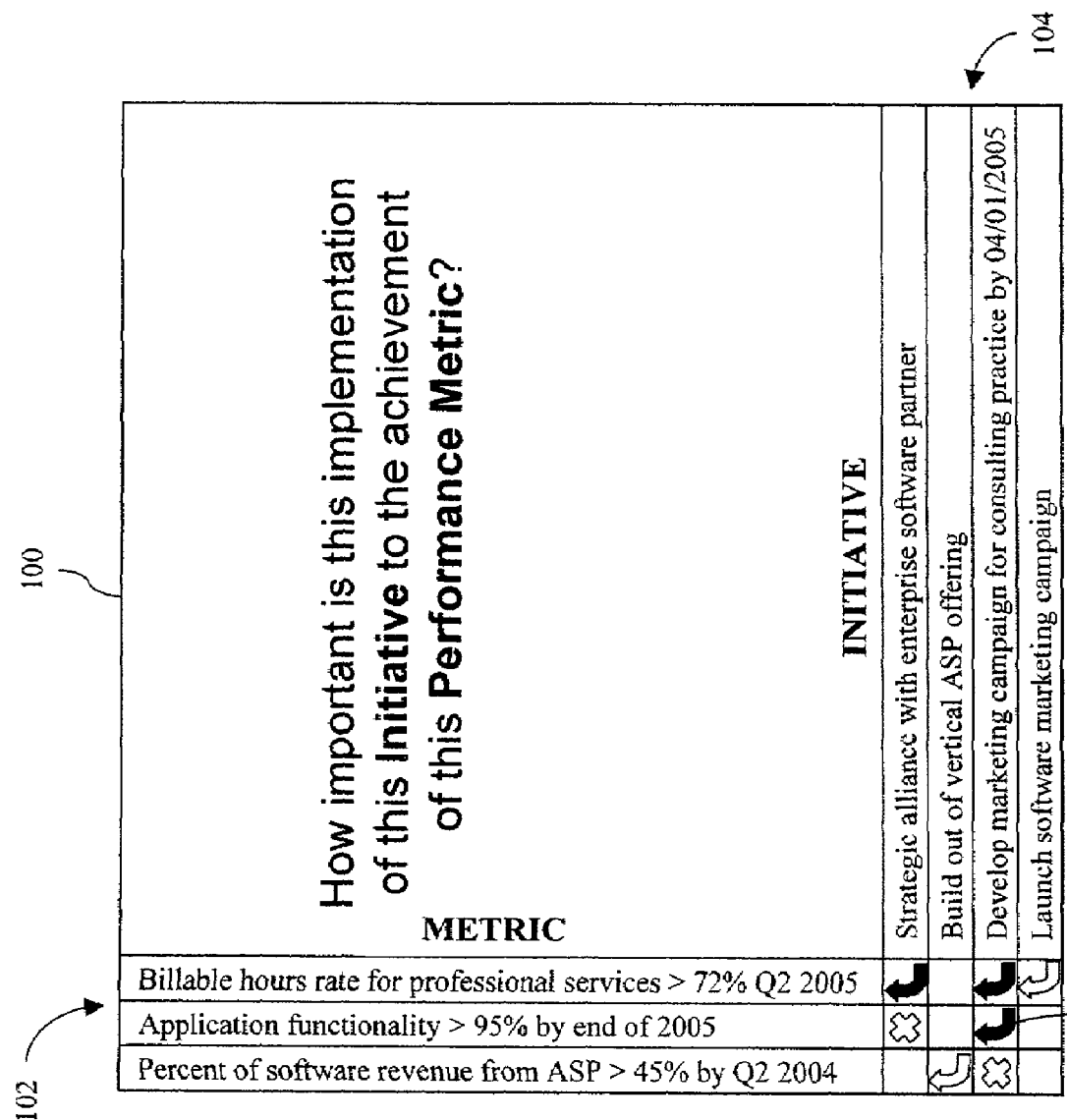
FIG. 7 illustrates a preferred embodiment of an alignment matrix.

Referring back to FIG. 4, a preferred embodiment of the STRATEGY ALIGNMENT module 40 includes four components: ALIGN STRATEGY 42, ALIGN OPERATIONS 44, PLAN 46 and ASSIGN 48. The software components of the STRATEGY ALIGNMENT module 40 function as part of a continuous cycle and may be executed by an end user at any time and in any order. A preferred embodiment of the ALIGN STRATEGY component 42 is illustrated in FIG. 6a. The ALIGN STRATEGY component 42 retrieves the approved strategy 80 that was generated by the SELECT component 38 of the STRATEGY FORMULATION module 30, as well as deployed performance metrics 92 previously generated by the ASSIGN component 48. The ALIGN STRATEGY component 42 is used by the organization's managers to ensure that the strategic elements of the approved strategy are aligned. The ALIGN STRATEGY component 42 outputs data describing the strategy alignment and strategic elements 94, such as the organization's initiatives, value platforms, performance metrics and leadership roles. The ALIGN STRATEGY component 42 may be implemented using conventional concepts of project management. FIG. 7 illustrates a preferred input screen 100 for use by managers in aligning strategic elements, such as enterprise initiatives and performance metrics. As illustrated, each metric is listed in a column 102 and each initiative is listed in a row 104. The end user utilizes the intersection between the columns 102 and the rows 104 (alignment matrix) to define the relationship between each metric and each initiative. In one embodiment, a symbol 106 is placed at the intersection of a metric and each initiative it supports. Preferably, a plurality of symbol types are used, such as arrows and "x"s, to further describe the relationship between the metric and initiatives support.

Figure 6B:
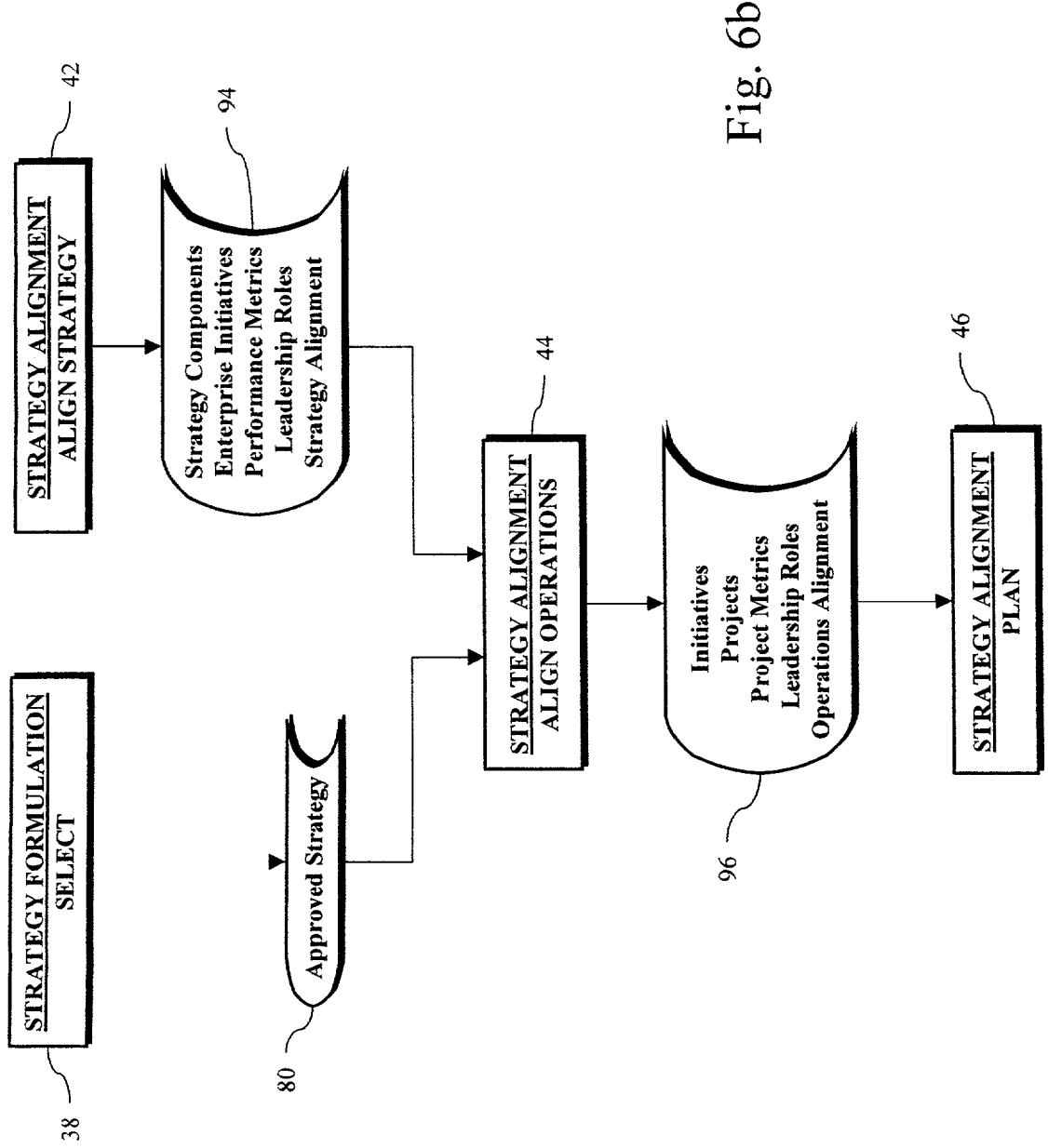

A preferred embodiment of the ALIGN OPERATIONS component 44 is illustrated in FIG. 6b. The ALIGN OPERATIONS component 44 retrieves the approved strategy 80 that was generated by the SELECT component 38 of the STRATEGY FORMULATION module 30, as well as the strategy components, enterprise initiatives, performance metrics, leadership roles and strategy alignment data 94 generated by the ALIGN STRATEGY component 42. The ALIGN OPERATIONS component 44 assists the organization's management in ensuring that essential aspects of the organization's operations, technology, and people are aligned with the approved strategy. The data 96 produced by the ALIGN OPERATIONS component 44 includes operational elements such as operations initiatives and projects, project metrics and leadership roles, as well as complete operations alignment data. The ALIGN OPERATIONS component 44 may be implemented using conventional project management concepts to integrate operational elements with the selected strategy. In a preferred embodiment, the operational elements are aligned by managers using an alignment matrix as illustrated in FIG. 7.

Figure 6C:
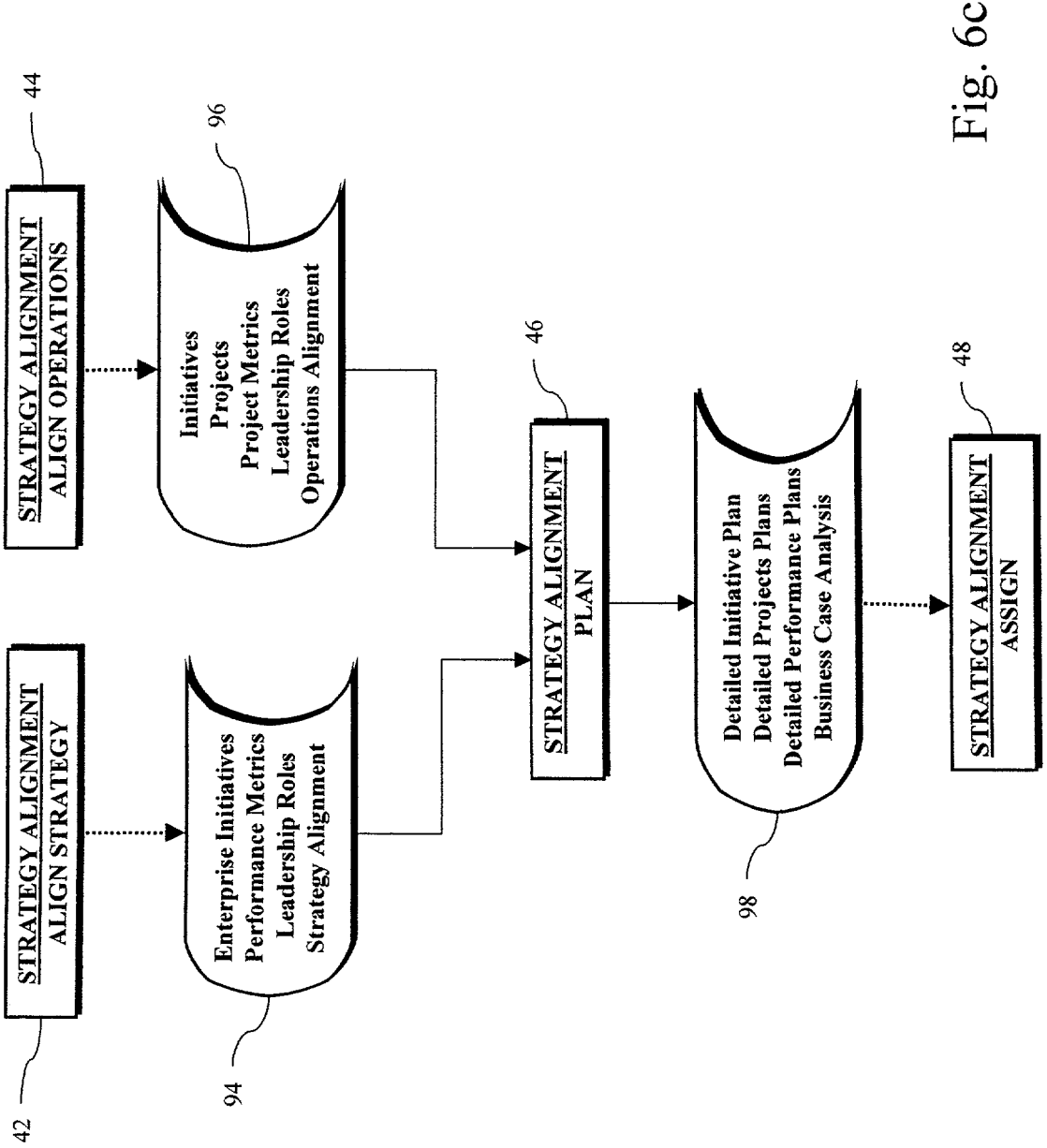

A preferred embodiment of the PLAN component 46 is illustrated in FIG. 6c. The PLAN component 46 retrieves the strategy alignment, operational alignment, initiatives, projects, performance metrics and leadership roles 94 and 96 generated by the ALIGN STRATEGY component 42 and the ALIGN OPERATIONS component 44, respectively. The PLAN component 46 assists the organization's management in developing plans corresponding the approved strategy and alignments. In a preferred embodiment, the ALIGN OPERATIONS component 44 produces data 98 including detailed plans for initiatives, projects and performance, and a business case analysis. The ALIGN OPERATIONS component 44 may be implemented using conventional project planning methods.

Figure 6D:
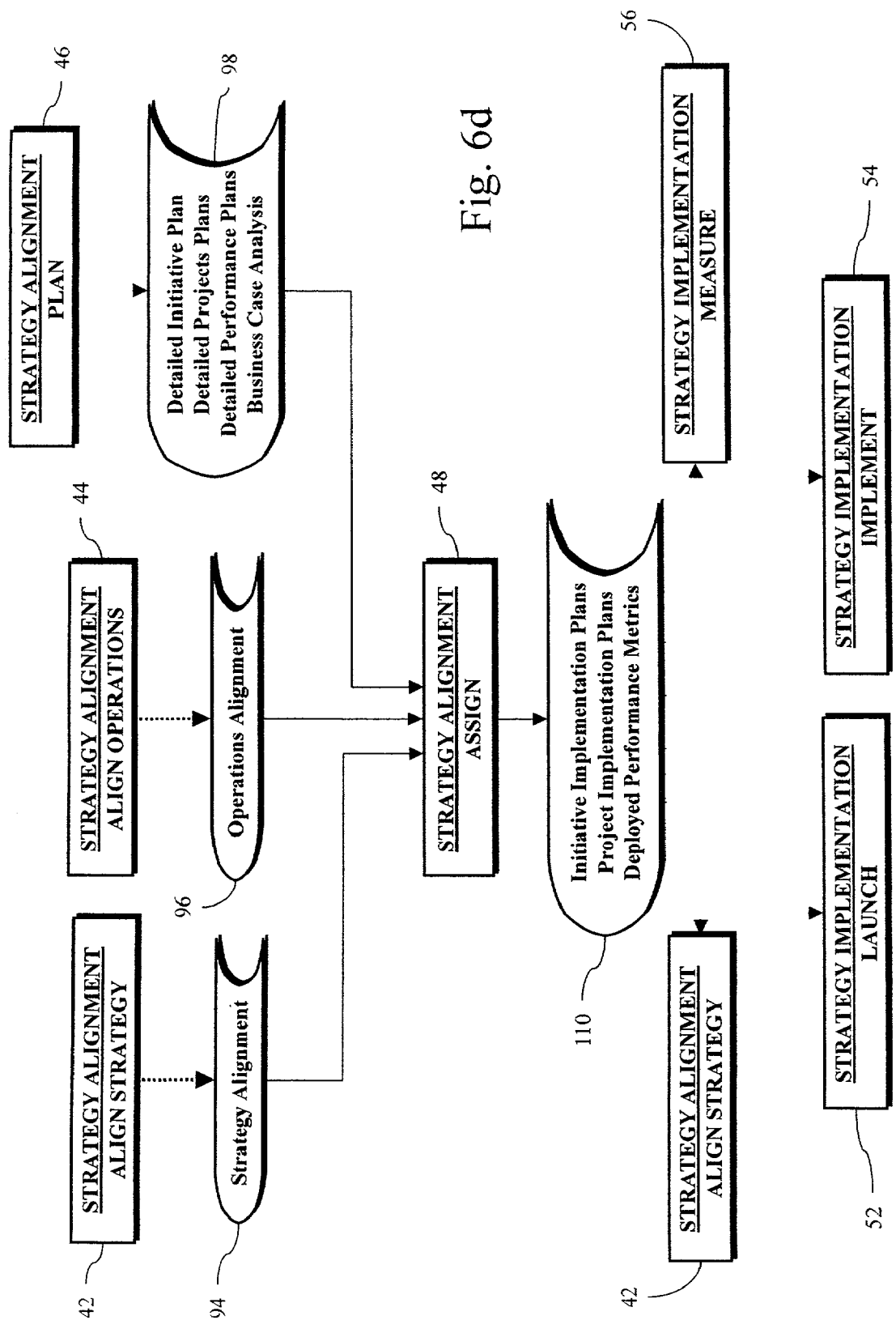

A preferred embodiment of the ASSIGN component 48 is illustrated in FIG. 6d. The ASSIGN component 48 retrieves the strategy alignment data 94 generated by the ALIGN STRATEGY component 42, the operations alignment data 96 generated by the ALIGN OPERATIONS component 44, and the business case analysis and detailed plans for initiatives, projects and performance data 98 generated by PLAN 46. The ASSIGN component 48 assists the organization's management in the synchronization, approval and assignment of enterprise initiatives, projects and metrics. In a preferred embodiment, the output data 110 including initiative implementation plans, project implementation plans and deployed performance metrics are generated by the ASSIGN component 48. The output data 110 may be generated using conventional approaches as known in the art.

Figure 8A:
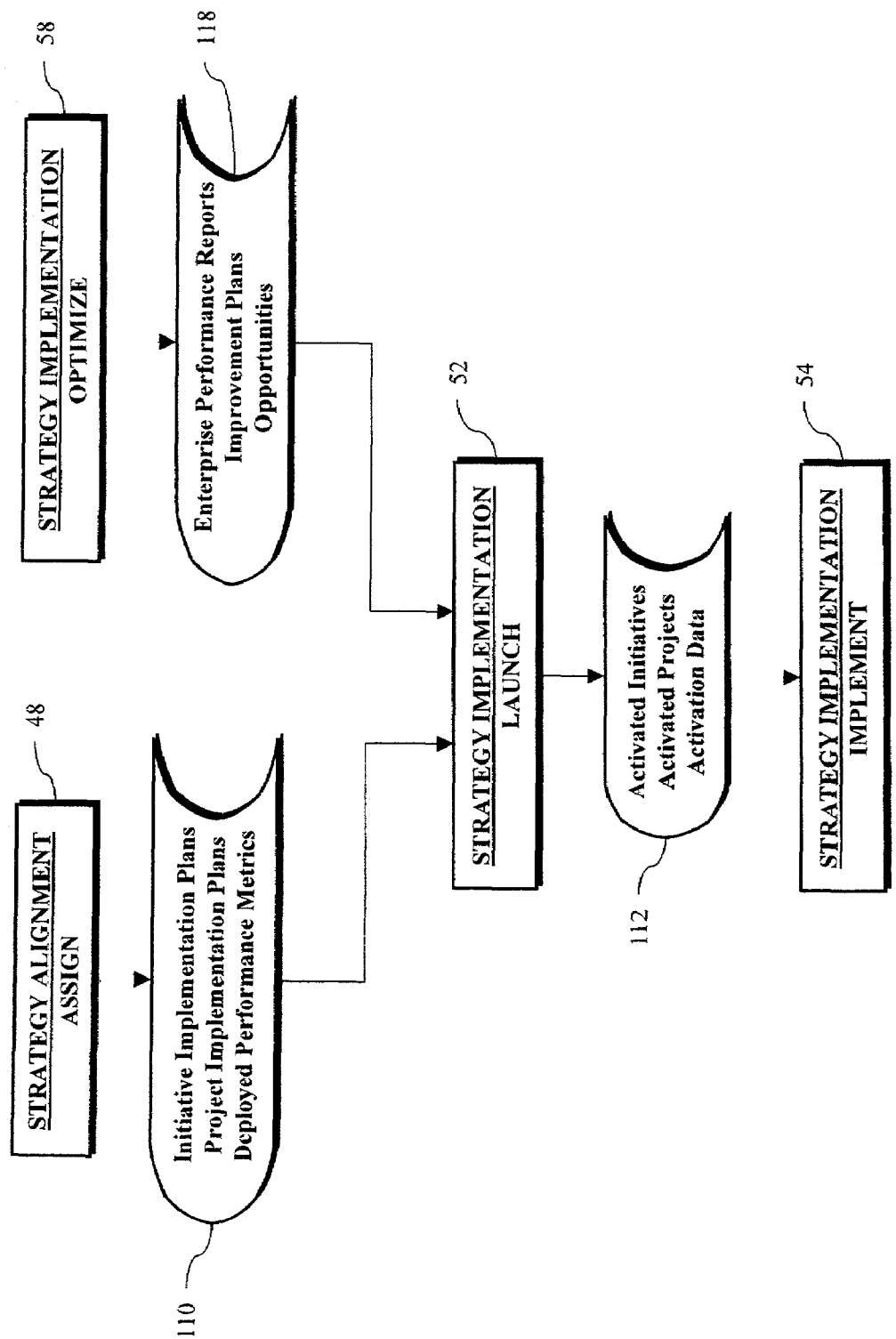

Referring back to FIG. 4, a preferred embodiment of the STRATEGY IMPLEMENTATION module 50 includes four components: LAUNCH 52, IMPLEMENT 54, MEASURE 56 and OPTIMIZE 58. The software components of the STRATEGY IMPLEMENTATION module 50 function as part of a continuous cycle and may be executed by an end user at any time and in any order. A preferred embodiment of the LAUNCH component 52 is illustrated in FIG. 8a. The LAUNCH component 52 retrieves the initiative implementation plans, project implementation plans and deployed performance metrics data 110 generated by the ASSIGN component 48 of the STRATEGY ALIGNMENT module 40. In addition, the LAUNCH component 52 retrieves data 118, including enterprise performance reports, improvement plans and identified opportunities, previously generated by the OPTIMIZE component 58. End users use the LAUNCH component 52 to manage the launch of implementation activity for the enterprise strategy. The LAUNCH component 52 generates a status list of activated initiatives, activated projects and other related data 112.

Figure 8B:
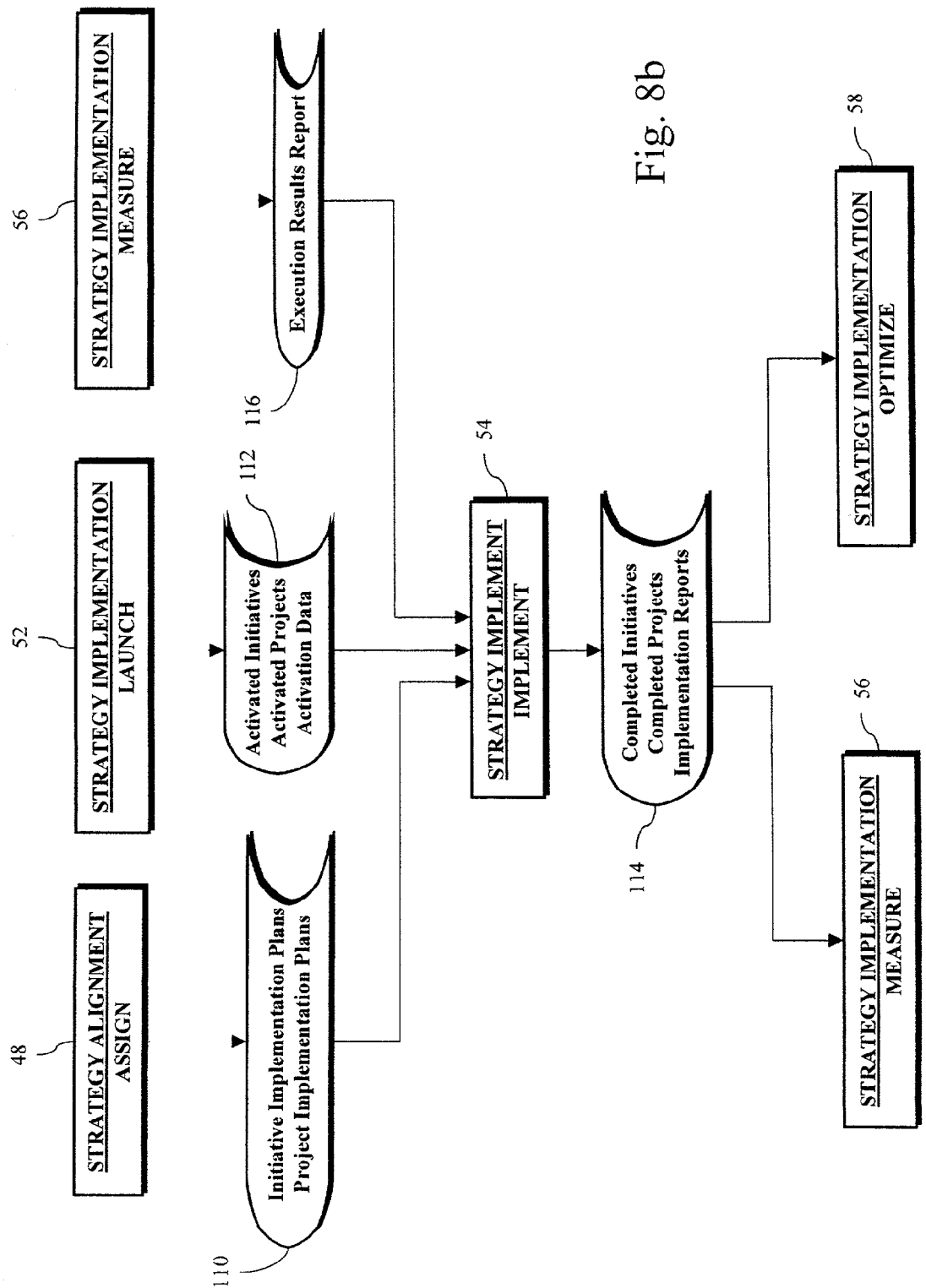

A preferred embodiment of the IMPLEMENT component 54 is illustrated in FIG. 8b. The IMPLEMENT component 54 retrieves the initiative implementation plans and project implementation plans 110 generated by the ASSIGN component 48 of the STRATEGY ALIGNMENT module 40, the activated initiatives, activated projects and other related data 112 generated by the LAUNCH component 52, and an execution results report 116 previously generated by the MEASURE component 56. The IMPLEMENT component 54 assists managers in facilitating the day-to-day management of initiatives, projects and metrics. The IMPLEMENT component 54 maintains data 114 on completed initiatives, completed projects and implementation.

A preferred embodiment of the MEASURE component 56 is illustrated in FIG. 8c. The MEASURE component 56 retrieves the deployed performance metrics 110 generated by the ASSIGN component 48 of the STRATEGY ALIGNMENT MODULE 40, and implementation reports 114 from the IMPLEMENT component 54. The MEASURE component 56 includes application tools for reporting and tracking the implementation of the organization's strategy and produces an execution results report 116. The MEASURE component 56 may be implemented using conventional performance measurement approaches such as a Balanced Score Card.

A preferred embodiment of the OPTIMIZE component 58 is illustrated in FIG. 8d. The OPTIMIZE component 58 is adapted to receive completed initiatives, completed projects and implementation reports 114 from the IMPLEMENT component 54, and the execution results report 116 generated by the MEASURE component 56. The OPTIMIZE component 58 provides application tools for managers to use in identifying opportunities and areas for improvement that arise during the execution of the organization's strategy. The OPTIMIZE component 58 produces output data 118 such as enterprise performance reports, improvement plans and lists of opportunities. The OPTIMIZE component 58 may be implemented using feedback loop concepts to match opportunities with resources.

Figure 1:
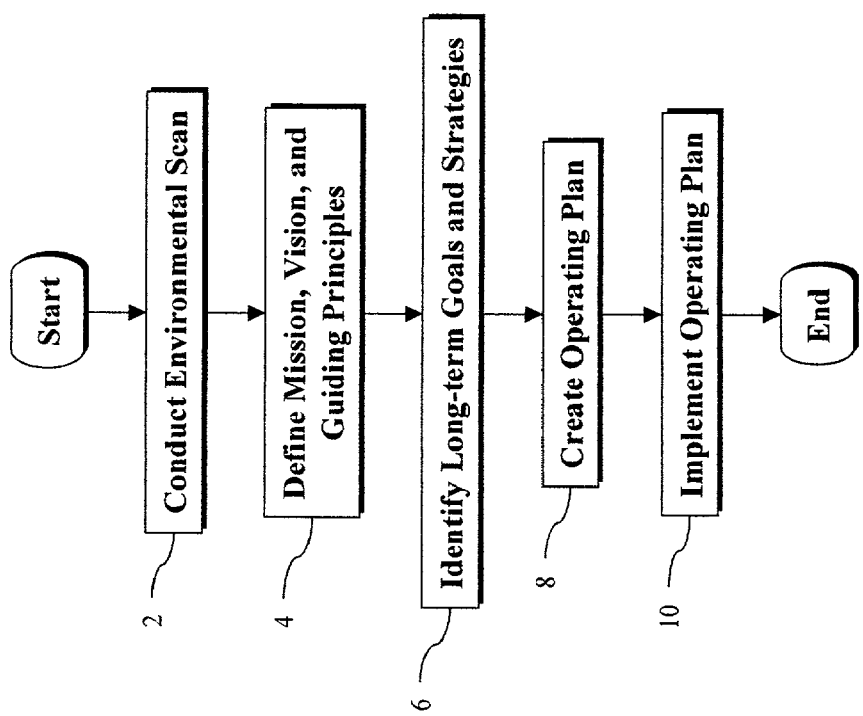
FIG. 1 is a flow diagram illustrating a prior art strategic planning process.

Having thus described a preferred embodiment the System and Method for Enterprise Strategy Management, it should be apparent to those skilled in the art that certain advantages of the within described system have been achieved. It should also be appreciated that various modifications, adaptations, and alternative embodiments thereof may be made within the scope and spirit of the present invention. For example, in the preferred embodiment the ESM includes three software modules, each of which includes four software components. However, it should be apparent to those skilled in the art that the present invention may be implemented with a different number of modules and components. In addition, it should be appreciated that the strategy formulation engine may be implemented as part of any strategy planning process, such as a conventional strategy planning process as illustrated in FIG. 1, or as a standalone application.

The scope of the present invention is defined by the following claims.

What is claimed is:

1. A method for developing an enterprise business strategy plan comprising the steps of:
   (a) receiving via a graphic user interface a first information for setting the strategic direction of a company comprising:
      receiving a description of a current state of the company,
      receiving a description of a future vision for the company,
      receiving a target date of the future vision and
   (b) processing the first information received to provide a first display of said current state, future vision and target date of the future vision;
   (c) receiving via a graphic user interface a second information defining a time-phased plan for implementing the future vision, the second information comprising:
      at least three separate and distinct sequential strategy development phases wherein the first phase begins at a current date and the last phase ends at the target date;
   (d) processing the received second information to provide a second display of the current state, the current date, a title of phase one, a title of phase two, a title of phase three, said future vision and said target date whereby the strategy is planned to be implemented so that the future vision is realized;
   (e) receiving via a graphic user interface a third information that defines a strategy platform integration, wherein the third information comprises:
      information defining a plurality of strategy platforms,
      information defining the corresponding strategy development phase where said strategy platforms are chronologically located,
      information defining the execution path and dependency for said plurality of strategy platforms;
   (f) processing the third information received for the strategy platform integration to provide a third display of an integration roadmap, where the integration roadmap displays said description of the current state of the organization as a polygon, said description of the future vision of the organization as a polygon, and said plurality of strategy platforms as each individual polygons that are displayed within their respective said strategy development phases, wherein the execution path and dependency of the strategy platforms is represented by interconnecting the strategy platform polygons with arrows;
   (g) receiving via a graphic user interface a fourth information that comprises:
      the said individual strategy platforms and four categories of requirements for each individual strategy platform;
      at least one respective individual requirement for each said category of requirements;
      an assessment of the respective individual requirements;
      a list of deployment requirements for of each respective strategy platform element; and
      a list of opportunities for the creation of value identified for each respective strategy platform element;
      wherein the said categories of requirements are selected from the group consisting of Operational Requirements, Organizational Requirements, Technology Requirements and Knowledge Requirements;
      wherein at least one individual requirement is received for each said four categories of requirements of the respective strategy platform; and
   (h) processing the fourth information received in (g) to:
      generate and display a polygon that is labeled with the name of one of the said individual strategy platforms and four adjacent polygons for each of the said categories of requirements for that individual strategy platform;
      generate and display within each of the said four adjacent polygons a strategy platform requirements category label, wherein said requirements category labels are selected from the group consisting of operational, organizational, technology and knowledge;
      generate and display within each of the said four adjacent polygons a list containing at least one requirement within a respective requirements category,
      generate and display adjacent to each at least one said requirement a polygon that is shaded to annotate the degree to which the current organization fulfills the respective requirement;
      wherein a fully shaded polygon indicates that the organization fully fulfills the respective requirement; and wherein a partially shaded polygon indicates the organization partially fulfills the respective requirement; and wherein an unshaded polygon indicates that the organization does not fulfill the respective requirement;
   (i) and further processing the fourth information received in (g) to additionally display a polygon that is labeled deployment requirements which displays a list of requirements for deployment; and to display an additional separate polygon labeled value creation opportunities which displays a list of opportunities for the organization to realize value creation.

* * * * *